United States Patent [19]
Kim

[11] Patent Number: 5,355,234
[45] Date of Patent: Oct. 11, 1994

[54] IMAGE SCANNING APPARATUS
[75] Inventor: Eun-jin Kim, Seoul, Rep. of Korea
[73] Assignee: Samsung Electronics Co., Ltd., Kyungki-do, Rep. of Korea
[21] Appl. No.: 168,322
[22] Filed: Dec. 17, 1993
[30] Foreign Application Priority Data Jul. 31, 1993 [KR] Rep. of Korea ............... 93-15008

[51] Int. Cl.$^5$ .................. H04N 1/04; H04N 1/46; H04N 9/07; H04N 9/73; G02B 5/23; G02B 3/08
[52] U.S. Cl. .................. 358/512; 358/516; 359/889
[58] Field of Search ............. 358/512, 516; 348/270, 348/271, 223; 359/889

[56] References Cited
U.S. PATENT DOCUMENTS

| 3,515,800 | 6/1970 | Ebihara et al. | 348/270 |
| 4,734,762 | 3/1988 | Aoki et al. | 348/223 |
| 4,809,062 | 2/1989 | Chen | 358/512 |
| 4,841,358 | 6/1989 | Kammoto et al. | |
| 4,851,899 | 7/1989 | Yoshida et al. | 348/270 |
| 4,945,405 | 7/1990 | Hirota | 348/223 |
| 5,153,717 | 10/1992 | Nitta | 348/270 |

FOREIGN PATENT DOCUMENTS 61-294963 12/1986 Japan .
62-102690 5/1987 Japan .
2-89463 3/1990 Japan .

Primary Examiner—Scott A. Rogers
Attorney, Agent, or Firm—Lowe, Price, LeBlanc & Becker

[57] ABSTRACT

An image scanning apparatus which can reduce a shading distortion generated by luminous characteristics of a light source, vignetting of a lens, etc. adopts color filters having a geometrical structure which enables to counterbalance a shading distortion and is characterized in that a line sensor is vertically arranged for the radial direction of the rotary filter. The image scanning apparatus can accomplish a simple shading calibration by arranging color filters and the line sensor so that a shading distortion is calibrated geometrically.

13 Claims, 20 Drawing Sheets

FIG. 1A (PRIOR ART)
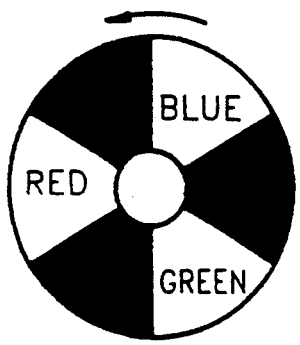
FIG. 1B (PRIOR ART)
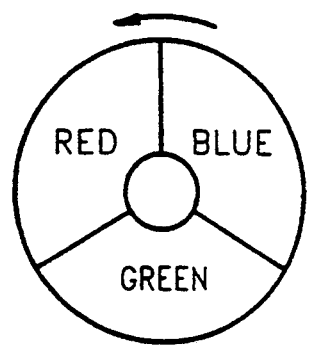
FIG. 1C (PRIOR ART)
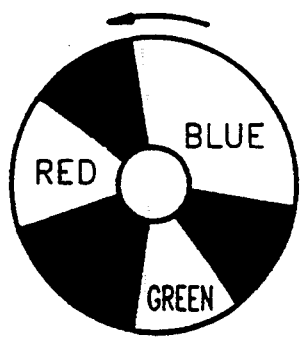
FIG. 1D (PRIOR ART)
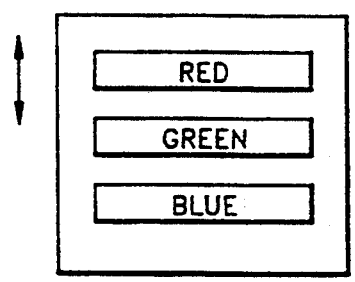
FIG. 2 (PRIOR ART)
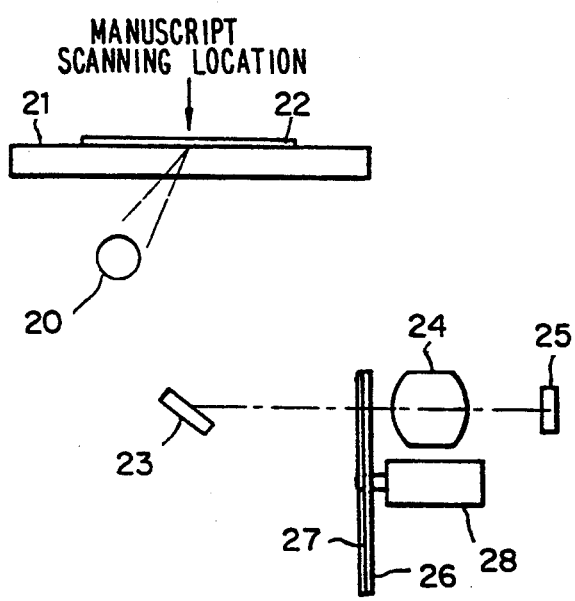
FIG. 3 (PRIOR ART)
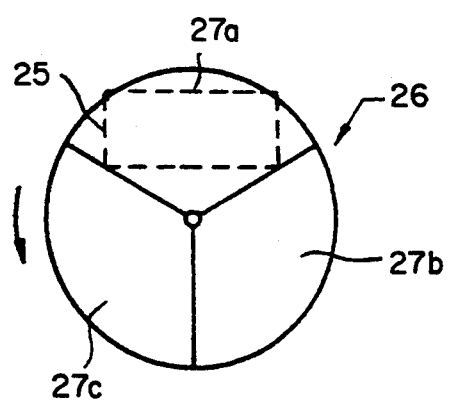
FIG. 3A (PRIOR ART)

F-PHOTO1='0'
F-PHOTO2='1'

F-PHOTO1='1'
F-PHOTO2='1'

F-PHOTO1='1'
F-PHOTO2='0'

ROTARY FILTER PLATE (TRANSPARENT)

BLACK (ACHROMATIC COLOR)
COLOR FILTER FILM
BLACK FILM

VALID FILTER ANGLE (MINIMUM)
θ (FILTER ANGLE)
θc1
θc2
VALID FILTER ANGLE (MAXIMUM)
θd (SEPARATION ANGLE)
ROTARY AXIS (ROTATION POINT)

IMAGE SCANNING APPARATUS

BACKGROUND OF THE INVENTION

The present invention relates to an image scanning apparatus for obtaining an image from an object (e.g., a sheet of paper bearing an image) by separating a light signal consisting of a plurality of color components which are incident to and reflected from the object into respective color signals through a plurality of color filters corresponding to the respective color components.

In order to realize color reproduction suitable for the human visual system in an image processing apparatus, it is important to match the color signal in the range of visible light to human visual system. The typical response characteristic of the human visual system with respect to the wavelengths of red (R), green (G) and blue (B) has been outlined by the Commission International de l'Eclairage (CIE) as CIE-RGB chromacity diagram. Based on such chromacity diagram, a color image processor controls the spectral properties of three primary color signals R, G and B.

An image scanning apparatus (e.g., a scanner) obtains the image information of an object by separating the color image information thereof into color information consisting of three wavelength bands (red, green and blue) and quantifying the respective color information by means of an image sensor. This is commonly known as "color separation."

Generally speaking, color separation adopts two conventional methods which are largely classified into (1) a method which combines a black-and-white image sensor and a set of color filters whose bandpass characteristics correspond to the R, G and B wavelengths, and (2) a method using a color image sensor. The former method can minimize the cost for the embodiment of the apparatus but is difficult to realize technically. The latter method easily realize the constitution of the apparatus but bears an excessive cost and has certain limitations with regard to improvements in spectral characteristic.

Currently, the above former method is generally adopted and can be further subdivided into three separate methods. These are (1) a lamp switching method which uses one image sensor and separates colors by means of a plurality of light sources having different luminous spectral characteristics, (2) a filter switching method which uses one image sensor and one light source and separates colors by means of a color filter having bandpass characteristics corresponding to the R, G and B wavelengths, and (3) an optical path separation or prism mirror method which uses one light source, redirects the R, G and B optical paths by arranging an element (e.g., a prism) on an optical path having various refractive indices and separates colors by means of three image sensors.

Among the above three subdivided methods, the second (the filter switching method) is the best in terms of speed and cost. The filter switching method is again divided into a rotary filtering method which switches the filters by a rotating movement and a plate filtering method which switches the filters by a linear movement, wherein arrows indicate the direction of movement of the rotary filters.

Rotary filter shown in FIG. 1A is disclosed in Japanese laid-open patent publication No. sho 61-294963. Here, a rotary filter is shown, wherein a set of red, green and blue color filters are installed on a rotary circular plate. In the case of a color image, the image information of the R, G and B wavelengths is obtained by rotating the rotary filter. For monochromatic images, the rotary filter is fixed and a single color filter is used to obtain image information.

Rotary filter shown in FIG. 1B is disclosed in Japanese laid-open patent publication No. sho 62-102690. Here, a rotary circular plate is installed in front of an image input apparatus. Then, a color filter for separating the three primary colors is attached to the rotary circular plate.

Rotary filter shown in FIG. 1C is disclosed in Japanese laid-open patent publication No. hei 2-89463 and is similar to that of FIG. 1A. Here, however, each color filter occupies a different sized area in order to maintain color balance.

Rotary filter shown in FIG. 1D is disclosed in U.S. Pat. No. 4,841,358 and shows a flat plate filter for switching filters by a rectilinear reciprocation.

However, none of these disclosures propose a specific device for calibrating a shading error due to the luminous characteristic of a light source and the vignetting characteristic of a lens. In general, a shading calibration is performed by an electrical circuit which can accomplish such calibration for shading errors of about 30% but no more. Moreover, even if the shading error is less than 30%, deterioration of the picture quality due to the calibration cannot be avoided.

FIG. 2 is a configurational diagram of the image scanning apparatus adopting a conventional rotary filter.

In the apparatus shown in FIG. 2, a light signal containing plural color components generated in a fluorescent lamp 20 is irradiated onto an image-bearing object 22 placed on a stand 21. The light signal reflected from image-bearing object 22 is incident to a line sensor 25 via a reflecting mirror 23 and a lens 24. The line sensor 25 generates an electrical signal proportional to the intensity of the incident light signal. A rotary filter 26 having a color filter 27 is installed between reflecting mirror 23 and lens 24. When rotary filter 26 is rotated by a driving motor 28, the respectively installed color filters 27a, 27b and 27c (FIG. 3) are sequentially interjected into the light path.

When an image is input by means of a line sensor, as in FIG. 2, one line of RGB information is input for every revolution of rotary filter 26. In the case of the image of an A4-sized sheet of paper (as prescribed by the International Organization for Standardization) being input with a resolution of 300 lines per inch, a rotation speed of 3,300 revolutions per minute is necessary to scan the sheet in one minute. To scan at higher speeds, rotary filter 26 should be rotated more rapidly. However, increasing the rotation speed results in a geometrical positioning error due to air friction of the filter and the unavoidable vibration of the rotating axis, and necessitates a cost increase for the pursuit of a high-quality driving motor.

FIG. 3 shows the relative position of a line sensor 25 with respect to the color filters 27a, 27b and 27c disposed on the rotary filter 26 of FIG. 2.

In the apparatus of FIG. 3, to input a subsequent line of image information after one line of image information is input, the sensor or the object to be scanned should be transported by one line interval. Given that color filters 27a, 27b and 27c are arranged equidistantly with respect to one another, since the transfer time of each filter cannot be established individually, the filter rotation is performed in conjunction with filter switching. As a result, a color registration error, whereby a pixel of a given point on the object cannot be matched with a pixel value of the corresponding location of R, G and B image information, is generated, thereby resulting in a geometrical distortion in the reproduced image. In particular, when an image consisting of a series of achromatic colors is input, the sharpness of the image contours is reduced, thereby resulting in a serious deterioration of picture quality.

SUMMARY OF THE INVENTION

Therefore, it is an object of the present invention to provide an image scanning apparatus which can attain an effect of a geometrical shading calibration.

Another object of the invention is to provide an image scanning apparatus which can easily improve resolution without increasing the rotation speed of a color separating filter.

Still another object of the invention is to provide an image scanning apparatus which can reduce a color registration error due to the transfer of an object to be scanned.

To accomplish the objects of the present invention, there is provided an apparatus for inputting a color image, which comprises a light source having a rod-like shape for generating a light signal having plural color components R, G and B and irradiating the light signal onto the surface of an object; an object transfer apparatus for controlling the relative motion of the light source with respect to the object; a color separating filter for separating the light signal reflected and transmitted from the object surface into plural color signals, by arranging a set of color filters corresponding to the respective color components in a predetermined pattern; a line sensor for receiving the separated light signal through one of the color filters and outputting an electrical signal corresponding to the intensity of the separated light signal; and driving means for adjusting a relative location between the color separating filter and the line sensor and combining the color separating filter and the line sensor in a predetermined order, and wherein the width of a light receiving surface of each the color filter gradually increases from the central area thereof to the periphery and the longitudinal axis of the line sensor is disposed in parallel with that of the light receiving surface.

An image scanning apparatus according to the present invention performs a shading calibration of the light signal geometrically through a color filter, by forming the light receiving surface area of the color filter so as to have an inverse characteristic to the luminous characteristic of the light source.

Also, in an image scanning apparatus according to the present invention, an exact synchronization of a filter movement with respect to a scanned object transfer is achieved by forming a time clearance equal to the period necessary for transferring the scanned object when a set of color filters is formed.

Moreover, an image scanning apparatus according to the present invention reduces a light signal refraction effect due to a base plate, by cutting away the portion of the base plate in which the color filter is to be placed and inserting the color filter therein, without attaching the color filter to the base plate, thereby reducing the color registration error.

BRIEF DESCRIPTION OF THE DRAWINGS

The above objects and other advantages of the present invention will become more apparent by describing in detail preferred embodiments thereof with reference to the attached drawings in which:

FIGS. 1A to 1D show conventional rotary filters.

FIG. 2 is a configurational diagram of the image scanning apparatus adopting a conventional rotary filter.

FIG. 3 shows an arrangement of a rotary filter and a line sensor in a conventional image scanning apparatus shown in FIG. 2.

DETAILED DESCRIPTION OF THE INVENTION

The detailed description of the present invention will be given hereinafter with reference to the accompanying drawings.

Figure 4:
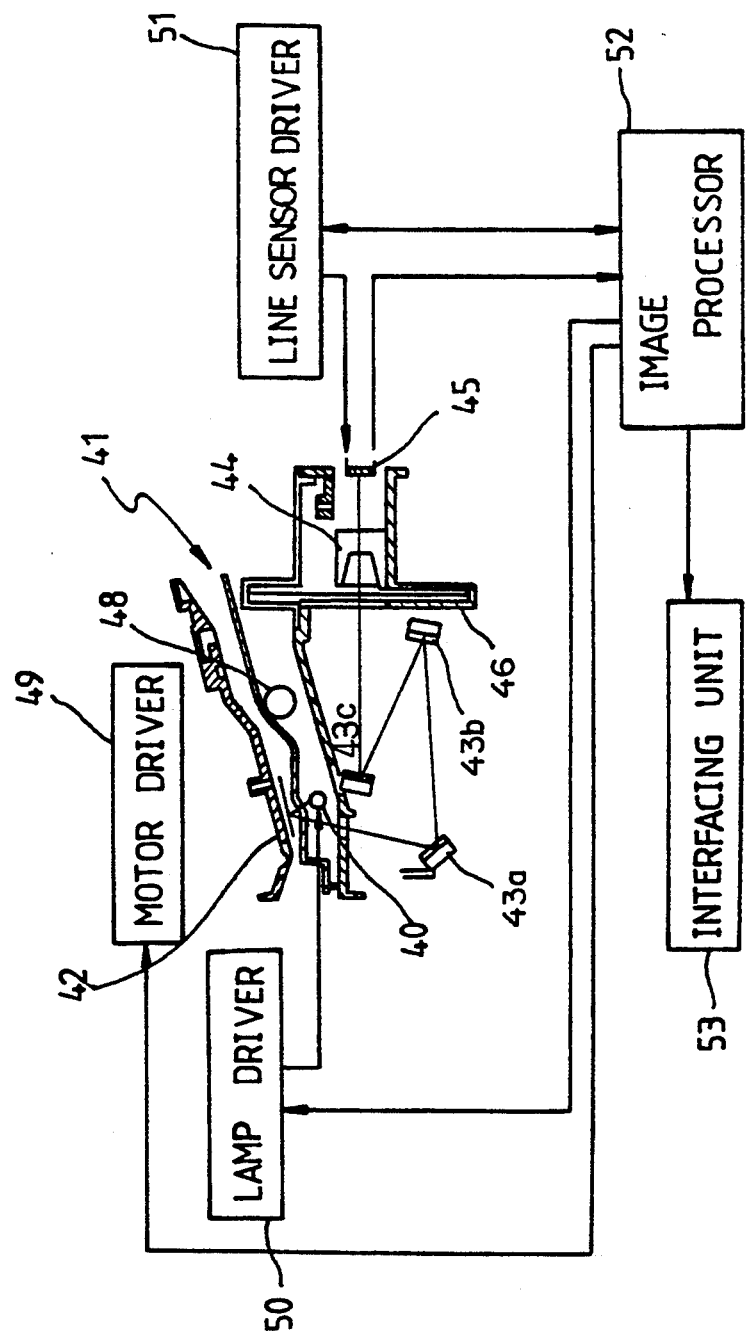
FIG. 4 shows a structure of the image scanning apparatus according to a preferred embodiment of the present invention.

FIG. 4 shows a preferred embodiment of the image scanning apparatus according to the present invention. In the apparatus of FIG. 4, when an image-bearing object 42 is transferred via a paper feed 41 by rotating a transfer motor 48, a light signal irradiated from a fluorescent lamp 40 is reflected from the object surface and transmitted to line sensor 45 via three reflecting mirrors 43a, 43b and 43c, a rotary filter 46 in which color filters (not shown) are separately installed, and a light condensing lens 44. A reference numeral 49 is a transfer motor driver for driving transfer motor 48, 50 is a lamp driver which drives fluorescent lamp 40, 51 is a driver for line sensor such as a charge-coupled device which drives line sensor 45, 52 is an image processor which performs a color balance calibration, shading calibration and tone calibration with respect to the image information generated from line sensor 45, and 53 is an interfacing unit for interfacing with an external system.

It is necessary to set an appropriate timing relationship between the rotation of transfer motor 48 and that of rotary filter 46. In FIG. 4, while transfer motor 48 is stopped, the color filters are switched by rotating rotary filter 46 so that the R, G and B spectral information can be obtained. In this way, a subsequent line of image information is scanned by moving transfer motor 48 by one step after scanning one line of the image information. By repeating such an operation by a number corresponding to the size of the object to be scanned, all the image information of image-bearing object 42 is supplied to image processor 52.

Figure 6:
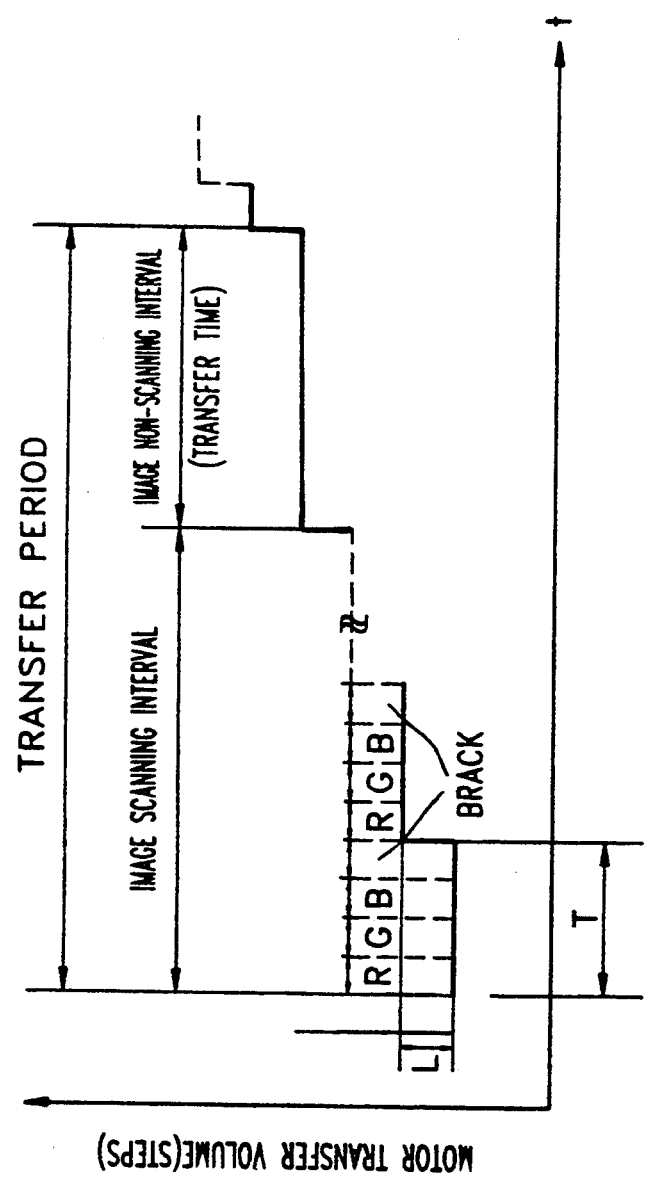
FIG. 6 is a timing chart showing the image scanning operation of the apparatus shown in FIG. 5.

A timing relationship between filter switching and object transfer is shown in FIG. 6 with regard to the aforementioned operation. In FIG. 6, the ordinate axis indicates the amount (distance) of object transfer by transfer motor 48 and the horizontal axis indicates time. The amount of transfer corresponding to one step of transfer motor 48 is indicated by a reference letter L and the time necessary for one line of transfer is indicated by a reference letter T. Time T is divided into the object's transfer time and that for scanning the spectral information of three wavelengths (R, G and B) through three filters (red, green and blue).

Figure 5:
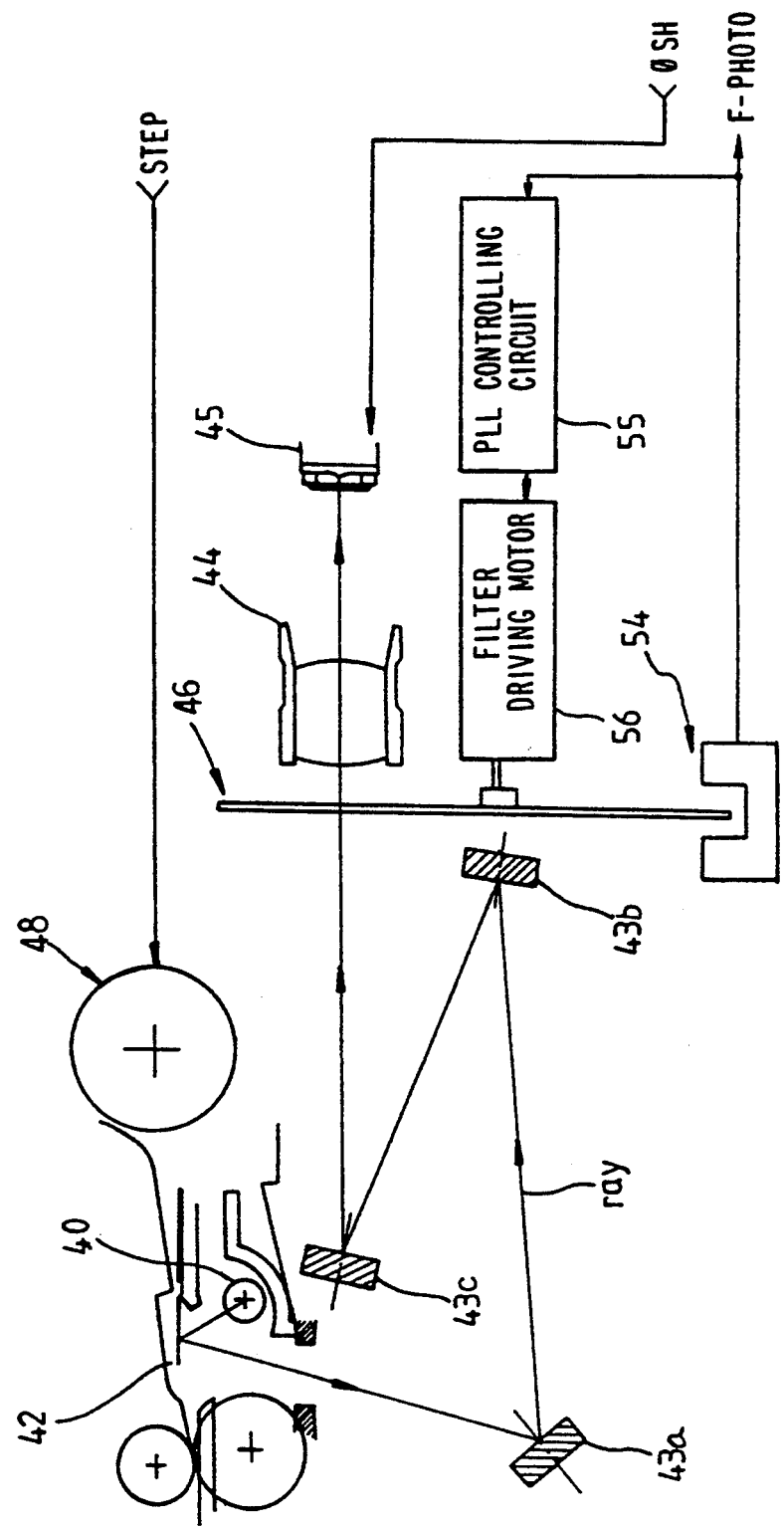
FIG. 5 is a detailed diagram of essential parts of the apparatus shown in FIG. 4.

FIG. 5 shows essential pans of the apparatus shown in FIG. 4 in more detail. In FIG. 5, when a groove (see FIG. 7) on rotary filter 46, which is for detecting a reference location, coincides with the position of photosensor 54, the photosensor outputs a signal F-PHOTO. The F-PHOTO signal is used as a reference signal for color synchronization according to the rotation of rotary filter 46 and for control of line sensor 45 and florescent lamp 40. Also, the F-PHOTO signal is input to a phase-locked loop (PLL) controlling circuit 55 to be used in controlling a constant speed of filter driving motor 56.

In order to drive rotary filter 46 for color separation, it is necessary to know through which color filter the light signal currently being received by sensor 45 is passing. To this end, the structures of FIGS. 7 and 8 are proposed in the present invention.

Figure 7:
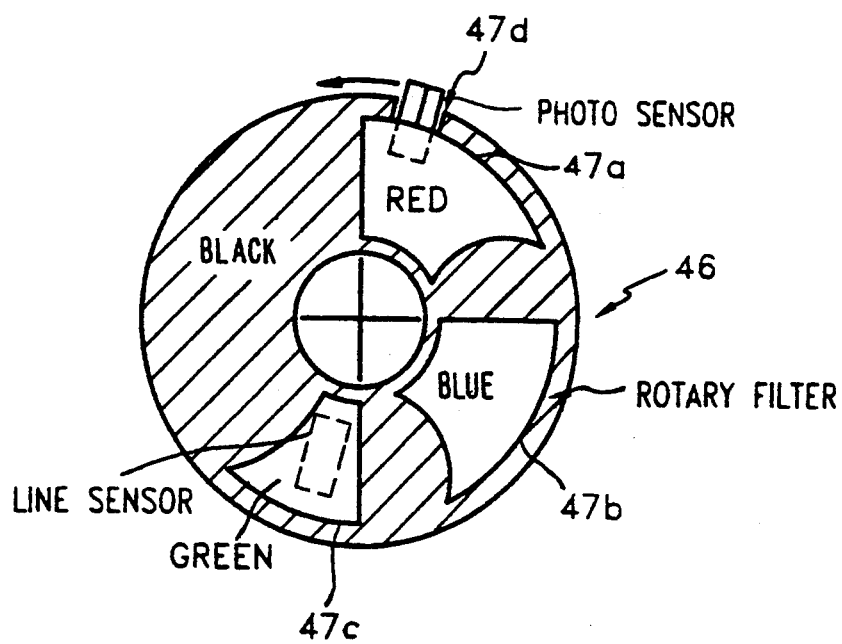
FIG. 7 shows an arrangement of the rotary filter and the line sensor shown in FIG. 5.

In FIG. 7, a filter location detecting groove 47d for passing the light signal is positioned at the edge of red filter 47a, with blue filter 47b and green filter 47c being located at intervals with respect thereto. Therefore, line sensor 45 receives the light signal through green filter 47c at the time of groove detection by photosensor 54.

Figure 8:
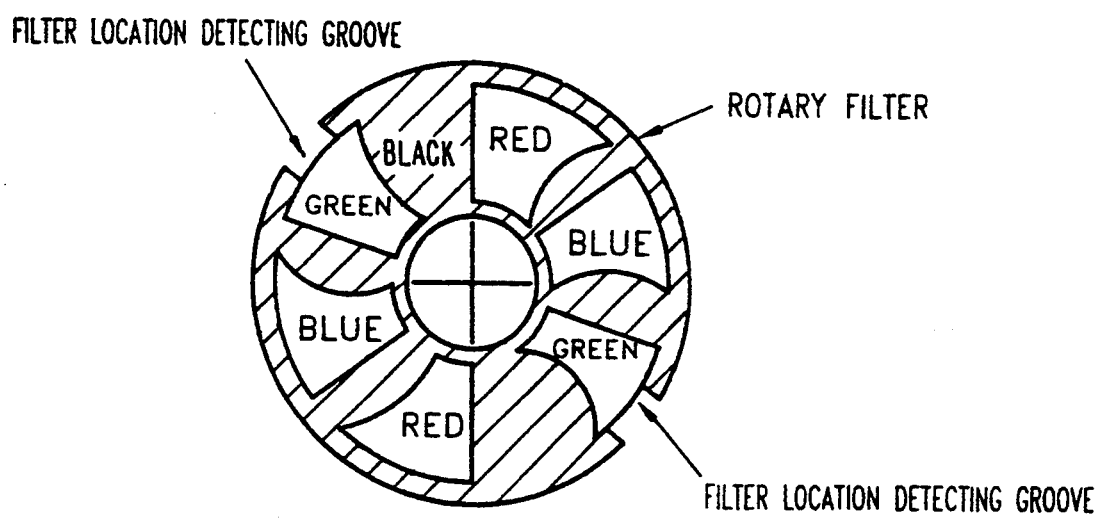
FIG. 8 shows another embodiment of the rotary filter shown in FIG. 5.

In contrast to FIG. 7, FIG. 8 shows two sets of color filters and scanning speed is directly related to the rotation speed of the rotary filter, in order to improve the resolution of the scanned image or improve scanning speed, the rotation speed of rotary filter should be increased. As shown in FIG. 8, with two sets of color filters being installed, the scanning speed is twice that of the case where only one set of filters is installed as in FIG. 7, and is accomplished without increasing rotation speed. Therefore, the increased generation of noise and vibration and the greater air friction of the rotary filter, which arise due to the increase of the rotation speed of the rotary filter, can be avoided. Here, the limit of additional filter sets which can be installed is determined by the desired resolution, the reduction rate of a lens and other factors. In general, the higher the lens reduction rate, the more filter combinations are permitted. It should be noted that if the light signal is received by line sensor 45 through more than one color filter at a time due an interval between the respective color filters which is too narrow, color interference may occur, which lowers the discrimination of color separation.

Figure 9A:
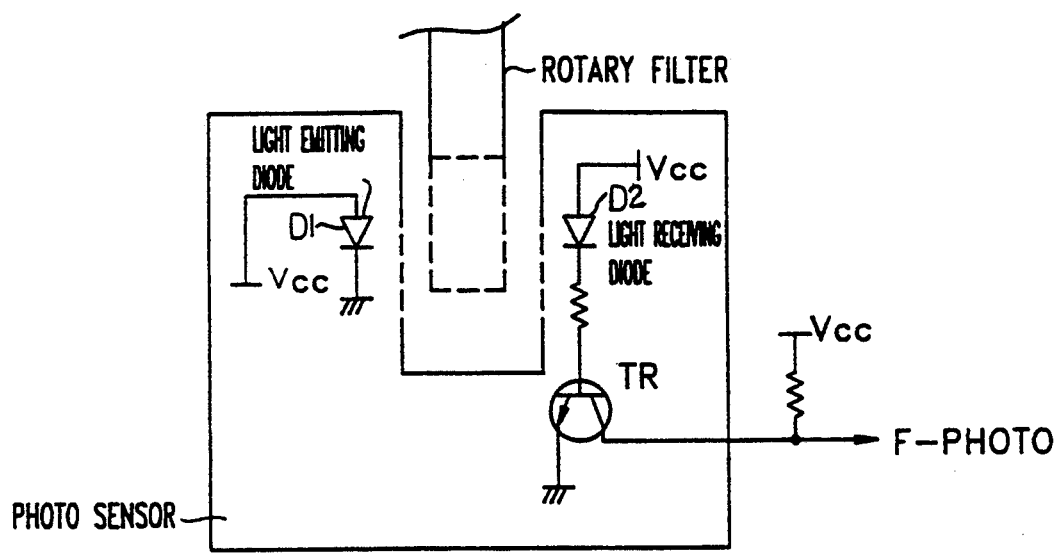
FIG. 9A shows the structure of the photosensor means shown in FIG. 5.

FIG. 9A shows the structure of the photosensor shown in FIG. 5. Transistor TR outputs the groove detection signal F-PHOTO when the filter location detecting groove is located between light emitting diode D1 and light receiving diode D2.

Figure 9B:
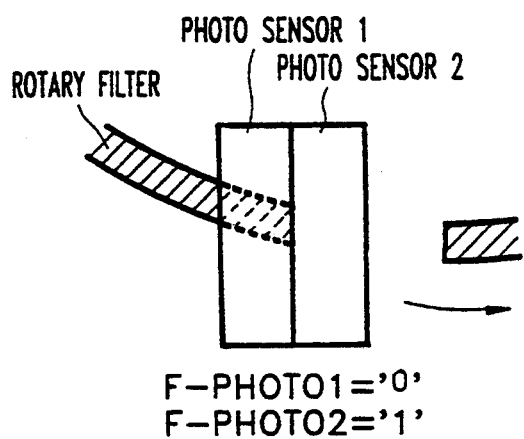
FIGS. 9B, 9C and 9D illustrate the operation of the photosensor means according to the rotation of the rotary filter.
Figure 9C:
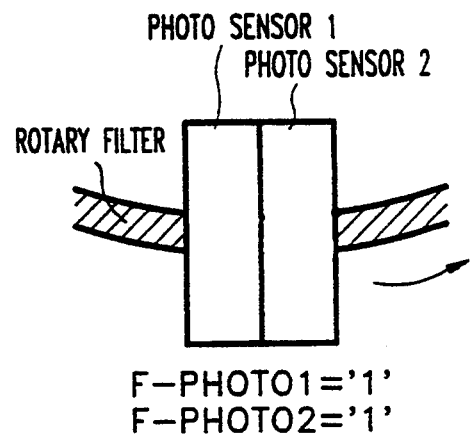
Figure 9D:
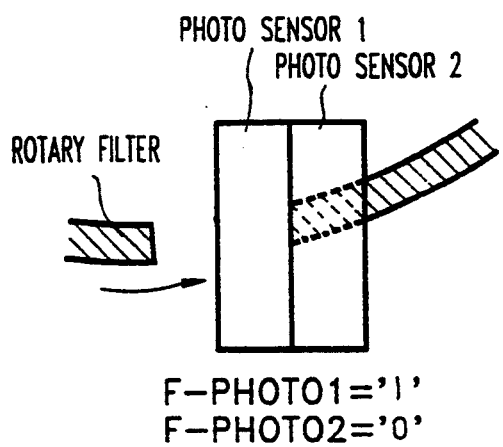

Referring to FIGS. 9B, 9C and 9D. the image scanning apparatus of the present invention employs two photosensors, with only one being used in a color mode wherein a color image is input and both (PS1 and PS2) being used in a black-and-white mode wherein a black-and-white image is input. Here, using photosensor means that the output signal F-PHOTO1 or F-PHOTO2 of the corresponding photosensor is used as a valid signal. The portion indicating the groove of the filter is transparent, the width of which may be the same as or slightly wider than the installation interval of the two photosensors.

In the black-and-white mode, to fix the rotary filter, filter driving motor 56 is controlled so that both output signals F-PHOTO1 and F-PHOTO2 from photosensor means 54 maintain a logic state of "1" (FIG. 9C). If the state of FIG. 9B is detected, that is, photosensor PSI outputs a logic "0" and photosensor PS2 outputs a logic "1," rotary filter 46 should be moved slightly forward and if the state of FIG. 9D is detected, that is, photosensor PS1 outputs a logic "1" and photosensor PS2 outputs a logic "0," rotary filter 46 should be moved in a reverse direction so that the state of FIG. 9C is maintained.

Figure 10:
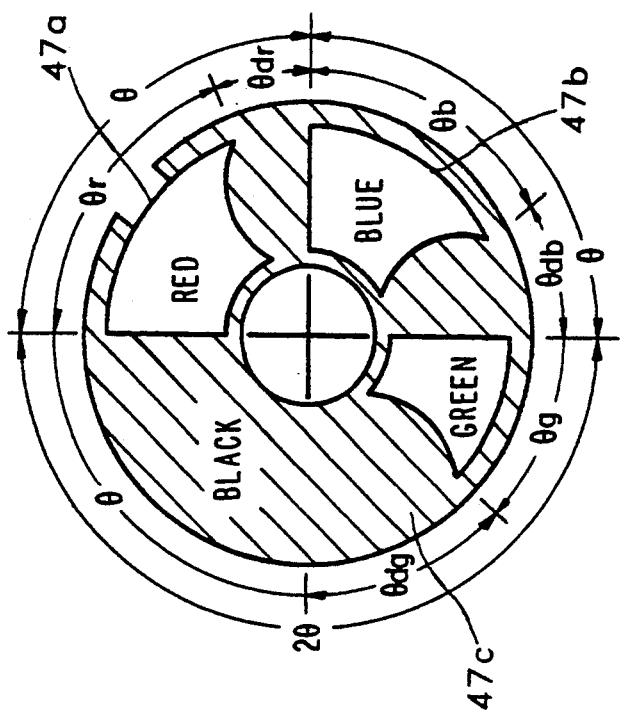
FIG. 10 shows an exterior structure of the rotary filter shown in FIG. 5.

It is important to install the respective color filters 47a, 47b and 47c on rotary filter 46 at appropriate intervals. FIG. 10 shows an arrangement of color filters 47a, 47b and 47c such that when one line of the object to be scanned is transferred, the color information is scanned in the order of green, then blue and then red. Then, the thus-scanned object is transferred to the subsequent line, as represented in the timing diagram of FIG. 6.

Referring to FIG. 10, it is assumed that the angle from the starting point of red filter 47a to that of blue filter 47b or from the starting point of blue filter 47b to that of green filter 47c is $\theta$, and the angle from the starting point of green filter 47c to that of red filter 47a is $2\theta$. Here, $\theta$ is the filter angle. The adopted filter angle provides important technical information in the present invention. When rotary filter 46 is rotated at a constant angular speed, photosensor means 54 of FIG. 5 generates the F-PHOTO signal for every revolution of rotary filter 46, with the period of this output signal becoming the scanning period for one line of information, which is shown as "T" in FIG. 6. Therefore, if filter angle $\theta$ is 360°/4, that is, 90°, the time allotted to each filter is T/4, and accordingly, the light exposing time of line sensor 45 becomes T/4.

Meanwhile, the relationship between the driving frequency and the light exposing time of line sensor 45 is as follows.

$$\frac{T}{4} \geq \frac{N_d + N_e}{F} \quad (1)$$

Here, Nd is a number of dummy pixels of the line sensor, Ne is a number of valid pixels of the line sensor and F is the driving frequency of the line sensor.

Also, the relationship between the rotational period T of rotary filter 46 and the time for scanning one page of the manuscript is as follows.

$$Tscan = L \times R \times T \quad (2)$$

Here, Tscan is the time necessary for scanning the entire object (e.g., one sheet of paper), L is the length of manuscript in the direction of subscanning and R is the scanning density per line.

Accordingly, when an image scanning apparatus is designed, if the parameters Tscan and R are set, the rotational speed of rotary filter 46 is determined. Accordingly the light exposing time of the respective colors according to three wavelengths is also determined. Moreover, the driving wavelength is determined by the pixel number of the line sensor.

The filter angle $\theta$ can be expressed as follows.

$$\theta = \frac{360°}{M(N+X)} \quad (3)$$

Here, M is the number of combinations (sets) of color filters installed on the rotary filter, N is the number of the color filters included in each set of color filter combinations, and X is the number of invalid intervals included in one set of color filters and is secured for a transfer operation to a subsequent line. Thus, in the case of FIG. 7 where N=3, M=1 and X=1, filter angle $\theta$ is 90°, and in the case of FIG. 8 where N =3, M=2 and X=1, filter angle $\theta$ is 45°.

Meanwhile, in FIG. 10, the valid angle, that is, the filter angle within which a filter is actually formed, of the red filter is indicated as $\theta r$. Similarly, the valid angles for the blue and green filters are $\theta b$ and $\theta g$, respectively. The respective valid angles are related to the sensitivity characteristics of the wavelength bands corresponding to the spectral optical system. In general, variations in spectral sensitivity characteristics result from a combination of such factors as the spectral characteristics of the illuminating light sources, the transmission factor of the color filters, the chromatic aberration of the lens and spectral sensitivity characteristics of the line sensor. If the above factors are not ideal, the color balance is disturbed and thus color balance calibration should be performed. One method of color balance calibration is to adjust the valid angle and another is to control the gain of color signal output from the line sensor. The former method can be easily embodied geometrically but, in doing so, color balance cannot be kept completely. Thus, it is desirable to adopt a combination of the two methods as in Japanese laid-open publication No. hei 2-89463.

The allotment of the valid angles can be expressed as follows.

$$\theta_c = R_c \left( \frac{\theta}{MAX[R_r, R_b, R_g]} \right) \quad (4)$$

Here, Rr, Rb and Rg are the sensitivity characteristics for red, green and blue in the dimension of the overall system, and Rc is one of Rr, Rb and Rg and a symbol MAX is a maximum value operation.

The difference angle between $\theta$ and $\theta c$ is a division angle $\theta dr$, $\theta db$ or $\theta dg$ of the respective color filters 47a, 47b and 47c. That is to say, the separation angle $\theta d$ is expressed as follows.

$$\theta d = \theta = \theta c \quad (5)$$

The separation angles of the color filters prevent color interference. Here, larger separation angles are more advantageous for color interference prevention. However, since this separation angle is closely related to the valid angle and the reduction rate of lens 44, the proper setting of the separation angle is important. Since the input line sensor 45 should be blocked during the time corresponding to the separation angle, the portion corresponding to a separation angle on rotary filter 46 should be opaque. An achromatic color of 0% (black) in the transmission factor is most preferable.

Figure 11A:
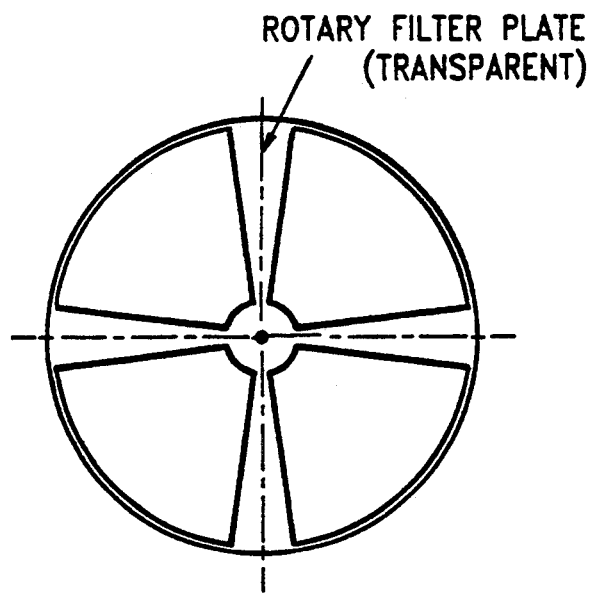
FIGS. 11A to 11C show in detail the structure of the rotary filter shown in FIG. 10.
Figure 11B:
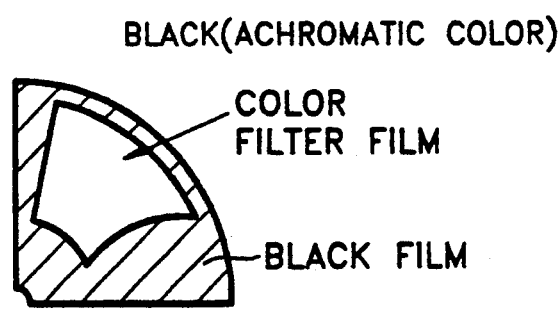
Figure 11C:
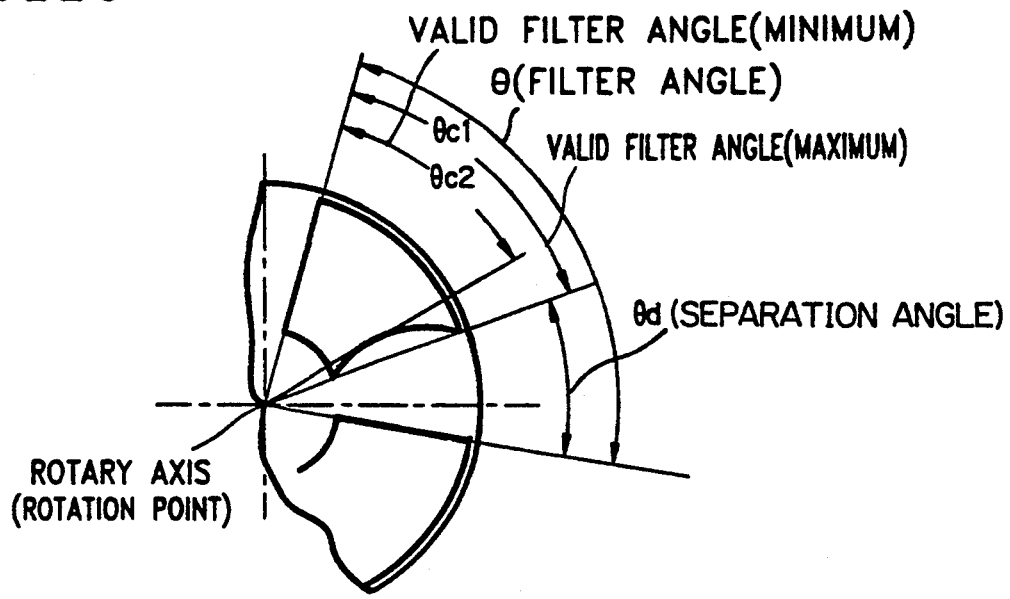

FIGS. 11A to 11C show a detailed configuration of rotary filter 46 shown in FIG. 10. FIG. 11A shows the plate on which the color filters are to be placed, FIG. 11B shows a film-like color filter and FIG. 11C shows the allotment of valid filter angles of color filters. The rotary filter of FIG. 10 is formed by attaching the filter of FIG. 11B onto the plate shown in FIG. 11A according to a filter angle shown in FIG. 11C.

The thickness of a filter directly influences a color registration error. In order to minimize such an influence in the proposed embodiment, the portion of transparent rotary filter plate 46a where filter groove 47d is to be positioned is cut away. Here, the plate is made of a plastic material of highly polymerized compounds. However, if the color filters are formed by dyes deposited on a glass plate, the thickness of the plate should be minimized.

Also, rotary filter 46 and line sensor 45 should be kept parallel. Conventionally, when the plane of rotary filter 46 is perpendicular to the rotational axis, a constant distance between the rotary filter and the line sensor is maintained, irrespective of the rotation of rotary filter 46. Otherwise, a tilt error is generated, as will be described with reference to FIGS. 12A, 12B and 12C.

Figure 12A:
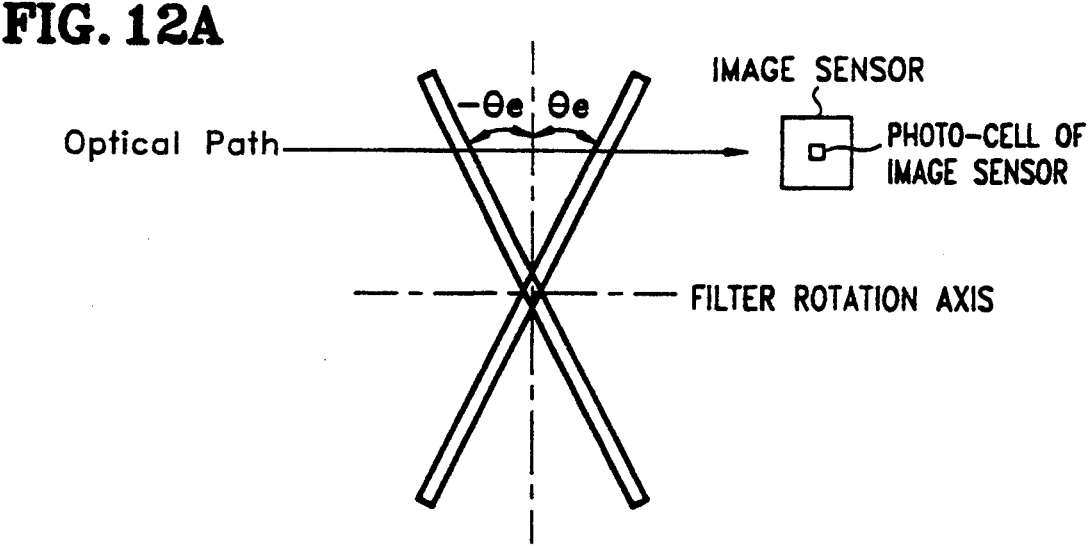
FIGS. 12A to 12C show the influence of the rotary filter on a tilt error.

FIG. 12A shows the case that rotary filter 46 is not perpendicular to the rotational axis. Here, the degree of deviation from the right angle is indicated as an error angle $\theta e$. In case the rotary filter has a set of the color filters and scans one line of the manuscript per one rotation of the rotary filter, assuming that the error angle becomes $+\theta e$ at a certain position, and the error angle becomes $-\theta e$ when the rotary filter rotates 180°, as in FIG. 7. Accordingly, the error angle in the same line becomes $2\theta e$.

Figure 12B:
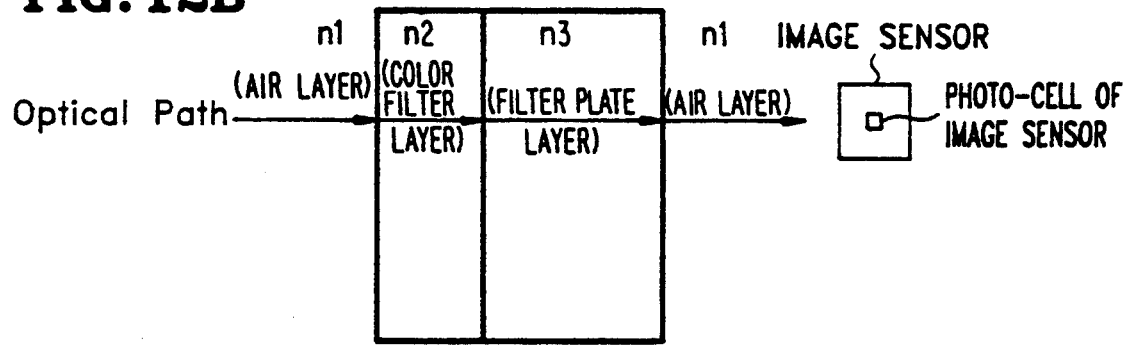

In FIG. 12B, showing the optical path for an error angle of 0°, the light reflected from the scanned surface has an incident angle of 0°. Therefore, the reflected light is perpendicularly incident to line sensor 45, through air layer having a refractive index n1, color filter layer having a refractive index n2 and the filter plate layer having a refractive index n3.

Figure 12C:
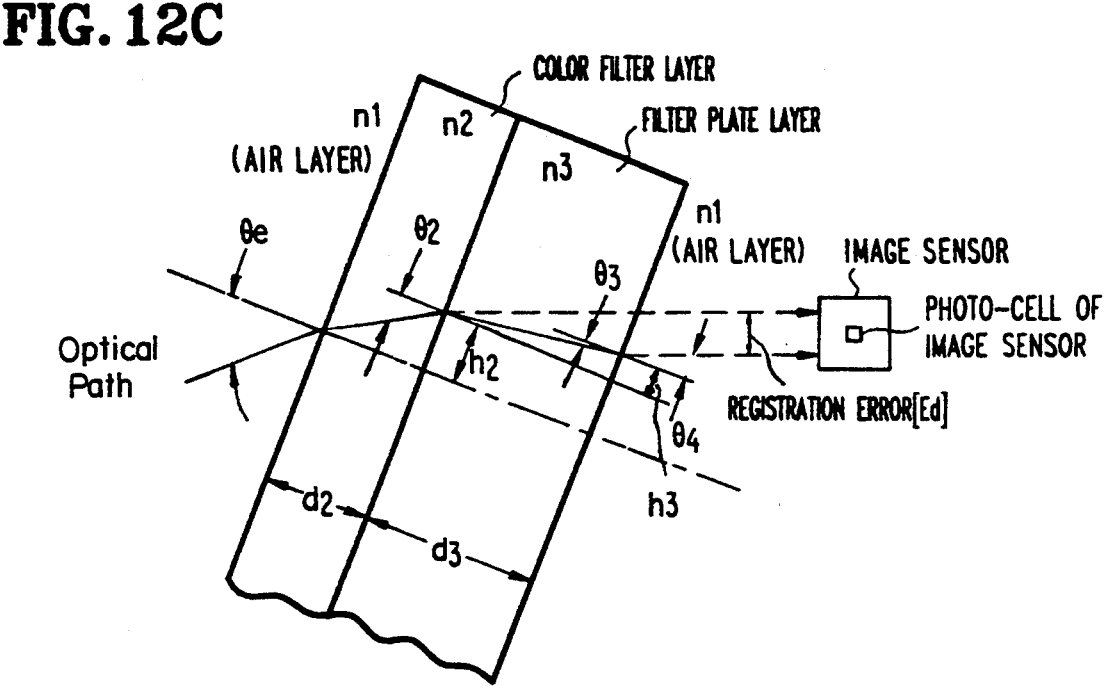

FIG. 12C shows the case where the optical path includes an error angle e. Here, in contrast with FIG. 12B, the reflected light incident to the color filter has an incident angle of θe,. Accordingly, the light is refracted according to the refractive indices of the color filter layer and filter plate layer and then is incident to line sensor 45 with a deviation from the original location by a registration error Ed.

As stated above, since the error angle produced per one rotation of the rotary circular plate is θe, the actual deviation is 2Ed, which is a color registration error and is equal to the sum of the error h2 due to refraction of the color filter layer and the error h3 due to refraction of the filter plate layer. The registration error Ed can be expressed as follows.

$$Ed = d2(\tan \theta 2) + d3(\tan \theta 3) \qquad (6)$$

Here, θ2 and θ3 are the refractive angles of the color filter and the filter plate, respectively, and d2 and d3 are the thicknesses of the color filter and the filter plate, respectively.

Meanwhile, the refractive angle is a function of the refractive indices of the respective media. If the refractive indices of the color filter and filter plate layers are both one, like that of air, the reflected light from the scanned object progresses along a straight line and only a slight deviation is produced. However, such media is impossible to manufacture, of course. Therefore, it is most important to design a medium so that a tilt error may not be produced. In addition, it is a secondly important requirement to minimize the thickness of the respective media. As mentioned above, since the tilt error of the rotary filter is produced in both sides, a registration error of 2Ed per rotation of the rotary filter, given that one set of rotary filters is used (as in FIG. 7). Essentially, the registration error occurs when the landing locations of R, G and B color image information in the line sensor are different for the same scanning location, which reduces resolution as they do not land in the same location of a reproduced image. Moreover, the registration error becomes greater as resolution is enhanced.

Assuming a resolution of 300 lines per inch, in which the distance between the respective lines is about 83 μm, if Ed is larger than 41.5 μm, the locations of the R, G and B color information corresponding to one scanned location will deviate one line or more on the reproduced image. If Ed is larger than 70 μm, the reproduced image becomes unpleasant to the eye. Moreover, if the reproduced image is enlarged, its appearance worsens fatally. Since the thickness of the color filter is thin enough to be negligible compared to that of the plate, the plate thickness becomes fundamentally important and should be as thin as possible. In the embodiment of the present invention, as shown in FIG. 11A, corresponding portions of transparent rotary filter plate 46a are cut away so that color filters 47a, 47b and 47c may be inserted therein in order to reduce the color registration error. Here, the characteristics of the color filter material are such that unnecessary ultraviolet rays and infrared rays are eliminated and the amount of transmitted light is regulated.

Meanwhile, it is important to maintain the weight balance of the rotary filter, with respect to both vertical and horizontal weight distribution. Otherwise, it is difficult to maintain a constant speed of the rotary filter. Also, since air resistance is increased in high speed rotation due to the concavo-convex portions of the plate wherein no filter is inserted, the rotation speed may become unstable. In such an event, the concavo-convex portions of the plate are covered with a transparent film exhibiting a transmission factor of nearly 100% across the entire visible light spectrum.

In rotary filter 46 shown in FIGS. 7, 8 and 10, the starting portions of respective color filters 47a, 47b and 47c are linear and the ending portions thereof are curved. However, in the present invention, the diverse shapes of the starting and ending portions of the rotary filters bear no consequence in practice, and this example of curved ending portions is only for the convenience of explanation. Here, the concavo lens shape of one side of the respective rotary filters 47a, 47b and 47c is chosen so that the valid filter angle is smaller in the central area and larger in the outer areas. This reason will be explained with reference to FIGS. 13A to 13D.

Figure 13A:
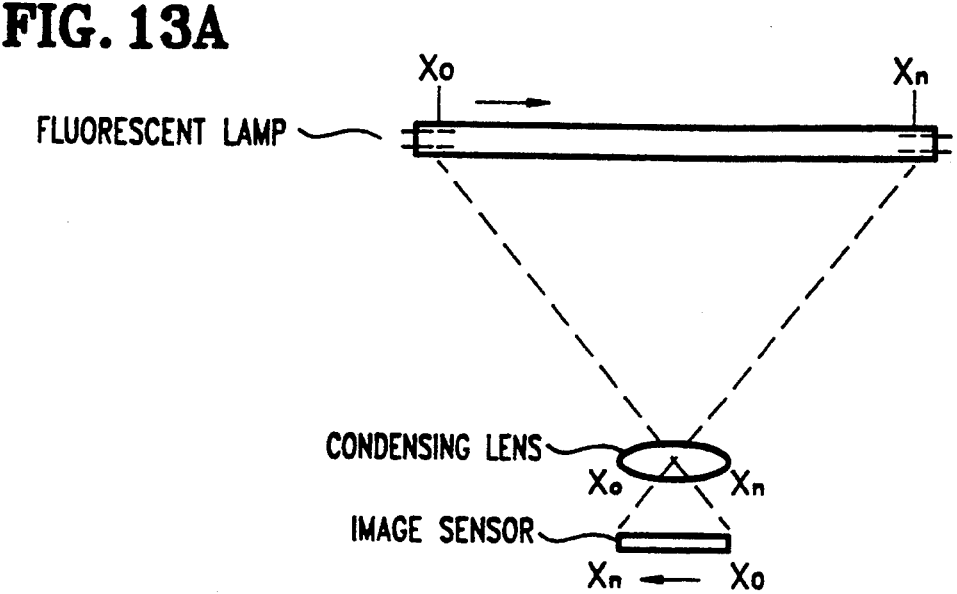
FIGS. 13A to 13D are characteristic diagrams showing a shading distortion phenomenon occurring in a line sensor.
Figure 13B:
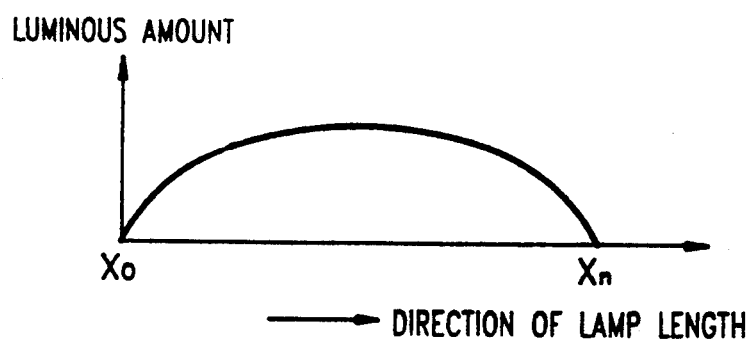
Figure 13C:
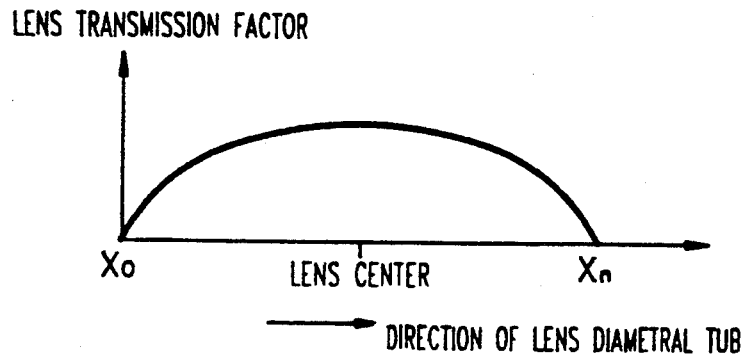
Figure 13D:
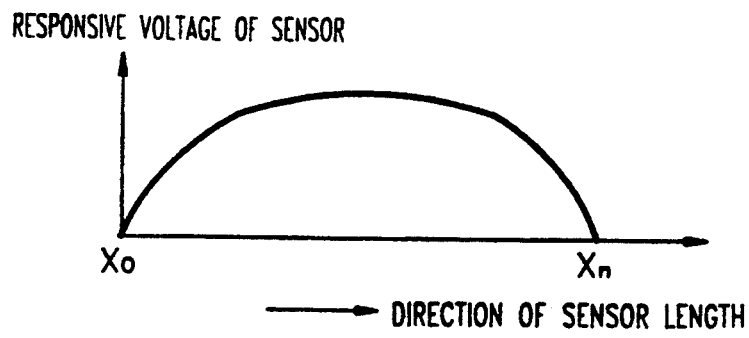

FIG. 13A shows the arrangement of lamp, lens and line sensor. A hot-cathode tube or cold-cathode tube is adopted as the light source for image scanning apparatus. Such a light source has luminous characteristics such that the ends thereof emit the least light while its central area emits the most light, as illustrated in FIG. 13B. Also, an optical system producing reduced sized image using a condensing lens is generally adopted as the optical system of an image scanning apparatus because the cost for a line sensor and self-focus lens combination is excessive for optical systems producing equal sized image. A conventional condensing lens has the highest light transmission factor at the central point of the lens and which tapers off towards its periphery (called a vignetting characteristic), as illustrated in FIG. 13C. Here, the image becomes distorted due to a difference in the transmitted light intensity (luminosity), according to incident location and for a given amount of incident light. This phenomenon is called shading distortion (Refer to FIG. 13D).

In the present invention, to calibrate shading distortion optically, a curved concavo lens is used on each side of color filters 47a, 47b and 47c, which increases the actual light exposing time of the filter periphery by gradually enlarging the valid filter angle from the interior edge to the periphery of each color filter, since line sensor 45 is radially arranged toward the rotation axis of rotary filter 46 radiately, as shown in FIG. 7 in detail. Here, it is desirable for the locus of the curve, by which the valid filter angles of color filters 47a, 47b and 47c are regulated, to correspond to the shading distortion characteristic shown in FIG. 13D. However, for the sake of convenience, the curve may be divided into plural sections, and then the divided plural sections may be made linearly so that the curve becomes a poly-line. This is because it is almost impossible to calibrate a shading phenomenon completely using optical means only, due to the varying characteristics of each light source and lens. Also, it is technically easier to perform shading calibration via hardware using a shading calibration circuit.

Nevertheless, optical calibration is generally carried out in conjunction with shading calibration via hardware, and the reason for doing so is as follows.

First, the principle of the calibration by hardware will be explained. Assuming that for a location x along the main scanning direction of the line sensor, the scanned value for the color sample segment of the reference color (white) is expressed as Iwx and the scanned value for the object to be scanned (original) is expressed Iox and quantized into eight bits, that is, 256 steps. Accordingly, the calibrated value Ix can be shown as follows.

$$Ix = 256 \left( \frac{I_{ox}}{I_{wx}} \right) \qquad (7)$$

Meanwhile, a shading error rate Es, expressed as a percentage, is calculated thus: where Iwx(min) is the minimum value of the reference color and Iwx(max) is its $$E_s = \left( 1 - \frac{I_{wx(min)}}{I_{wx(max)}} \right) \times 100$$

maximum value.

In general, the calibrating level by the shading calibrating circuit is less than or equal to 30%. If the shading error rate is higher than this level, the calibration effect is reduced. Also, although the shading error rate is about 30% practically, the deterioration of the reproduced image following the calibration cannot be avoided. For example, assuming that the scanned value for the color sample segment of a reference white color is 180 at a random location of a main scanning direction when each color signal is quantized into eight bits, that is, 256 steps, the tone reproduction step at this location is only 181 steps. Further, since the scanned value for the color sample segment of the reference color is 180, the scanned value for an image to be scanned practically must be less than 180. Thus, although the absolute size of the tone value can be calibrated to some extent via shading calibration, the tone reproduction steps do not number more than 181 steps. To solve such a problem, it is desirable that, initially, 10~20% of the calibration is carried out optically and then calibration using a shading calibrating circuit is performed secondly.

Figure 14A:
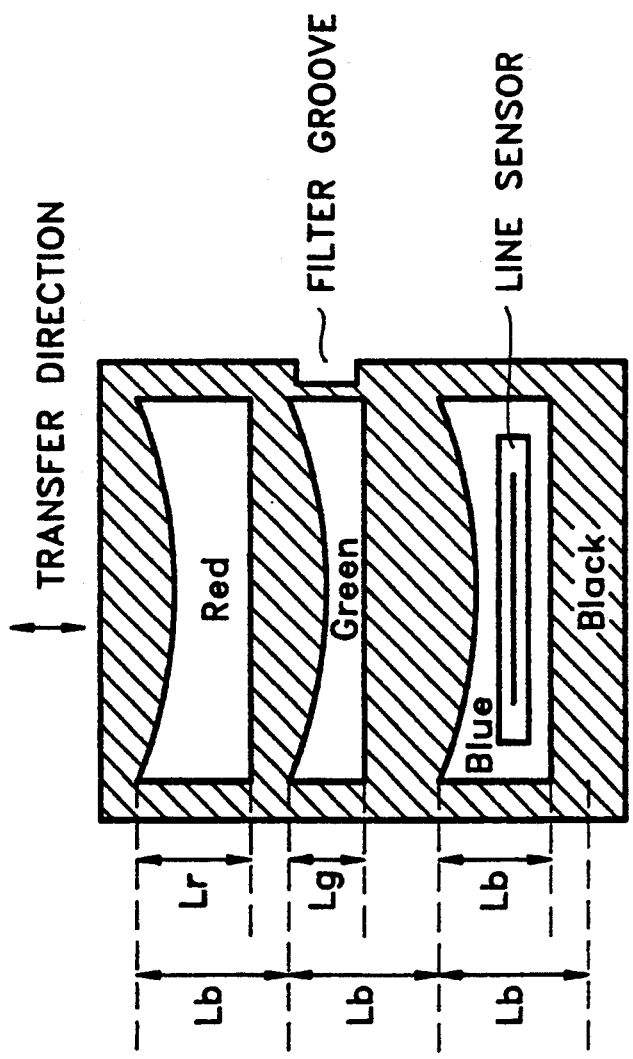
FIGS. 14A and 14B show an embodiment of a flat plate filter.
Figure 14B:
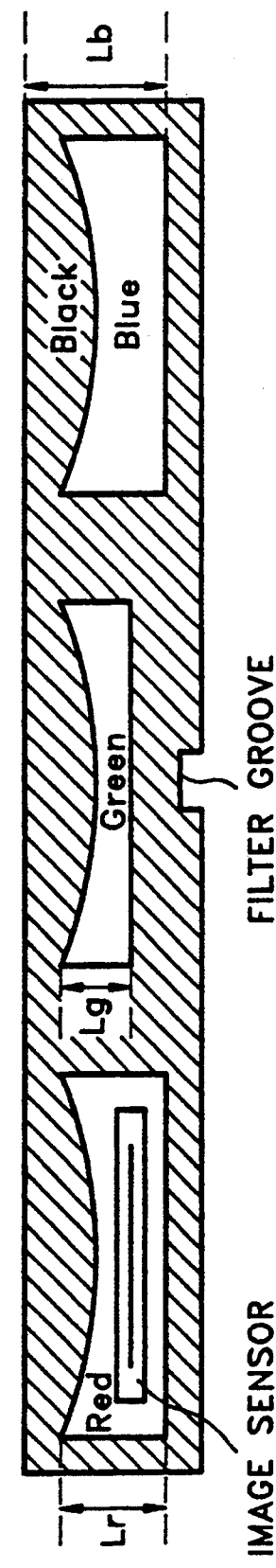

FIGS. 14A and 14B show flat plate filters which switch the color filters by a reciprocation. The difference between a flat plate filter and the aforementioned rotary filter result from the fact that rotary motion of a rotary filter is replaced with rectilinear reciprocation of the flat plate filters. If the rotation speed, filter angle θ of the rotary filter and valid filter angle θc (θr, θg or θb) are replaced with the speed of the linear movement and filter interval Lb of the flat plate filter, and valid filter height Lc (Lr, Lg or Lb), respectively, the operation can be understood by applying the same principles.

To move a flat plate filter linearly, we may use a cam, a linear motor, a piezoelectric phenomenon, etc. Such methods bear no differences in their operations, except that the power sources necessary for moving a flat plate filter are different, and although the rotary filter has only to rotate in one direction continuously during the scanning operation, the flat plate filter has to be reciprocated. In FIGS. 14A and 14B, the reference location detecting groove is installed at the location of a green filter, for convenience. Also, it is assumed that the line sensor is receiving the light signal through the green filter at the time of groove detection by photosensor means 54.

Here, if the flat plate filter is moved by one step in a positive direction (downward in FIG. 14A or to the left in FIG. 14B), then, the light signal is received by the line sensor through a red filter. If the flat plate filter is moved by one step in a negative direction (upward in FIG. 14A or to the right in FIG. 14B), the light signal is received by the line sensor through a blue filter.

In the case of a black-and-white image input mode, the flat plate filter is controlled so that the green-filtered light signal is received by the line sensor. For a color image input mode, the initial state is set so that the red filtered light signal is received by the line sensor, and then the flat plate filter is moved by one step in the negative direction to receive the green-filtered light signal and finally moved by another step in the same direction to receive the blue-filtered light signal. In this way, after scanning the spectral information of all three colors, the direction is switched to move the flat plate by two steps in the positive direction and thus be returned to the initial state, and simultaneously, transfer the object to be scanned by one line. Here, the operation of returning the filter to the initial state after one line of image information is input may reduce the scanning speed, but does not present such a critical problem in practice because the reciprocation period of the flat plate filter corresponds to the rotation period of the rotary filter if the transfer operation is performed in synchronization with the filter returning time. In the case of a flat plate filter, since the groove detection by photosensor means 54 happens twice per reciprocation, it is necessary to divide the F-PHOTO signal by two. Also, the color filters of the flat plate type are formed such that the light receiving width thereof is smaller in the central area and wider at the edges, as in the above-described rotary filter.

Figure 15:
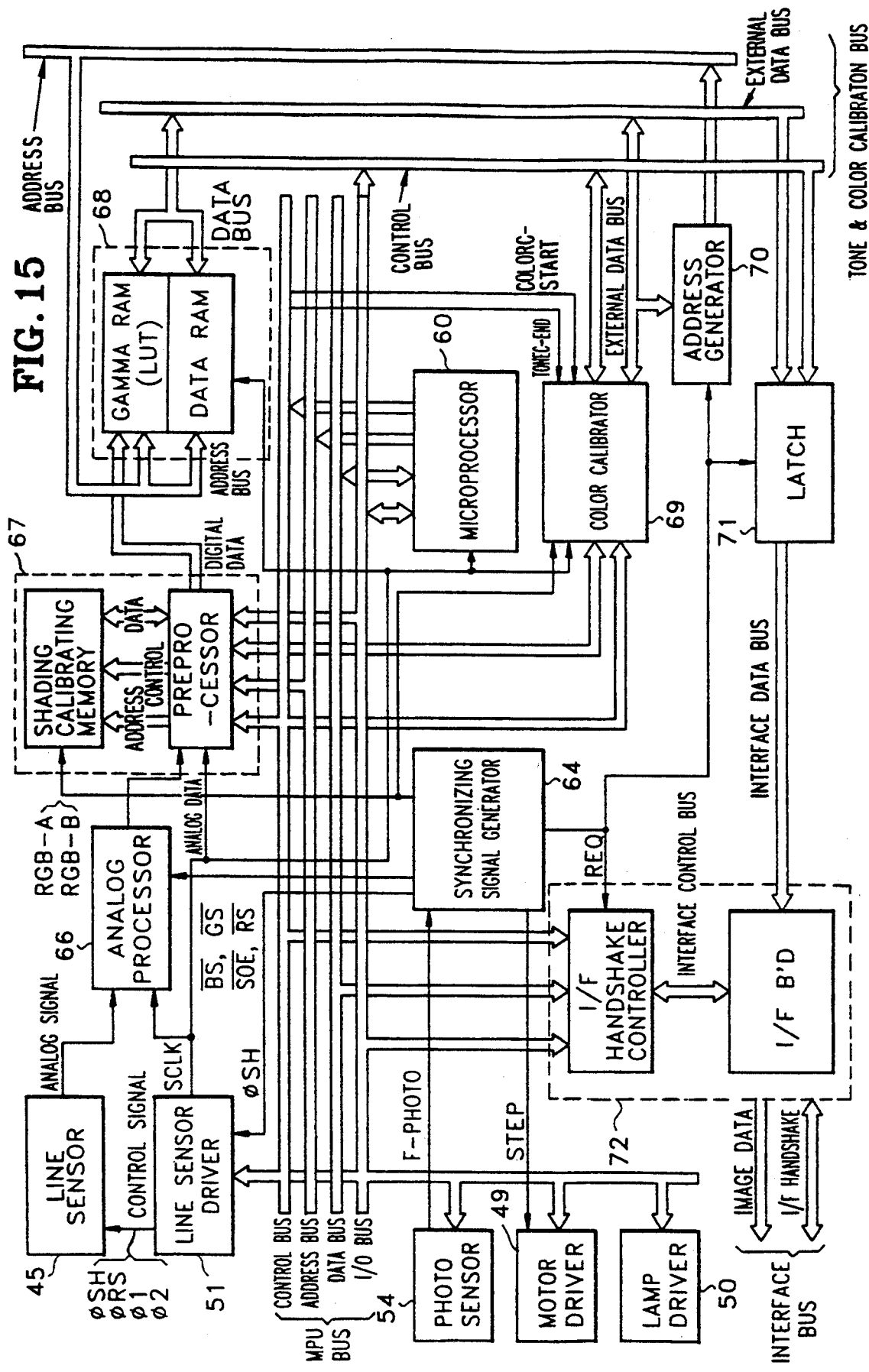
FIG. 15 is a block diagram showing the circuitry of the apparatus shown in FIG. 4.

FIG. 15 is a block diagram showing a circuitry of the apparatus shown in FIG. 4. In FIG. 15, microprocessor 60 which performs the overall control operation of the image scanning apparatus by performing the incorporated programs for scanning, pre-processing, tone calibration, color calibration, etc. synchronously, according to the movement status of color filters 47a, 47b and 47c, and outputs the processed image signal to the outside of the apparatus through an interfacing unit 72.

Synchronizing signal generator 64 receives a groove detecting signal F-PHOTO generated in the photosensor means 54 of FIG. 5, generates a light exposing control signal φSH determining the light exposing period of the line sensor, a driving signal STEP for transfer motor 48, and color information signals RGB-A, RGB-B, $\overline{GS}$, $\overline{BS}$ and $\overline{RS}$ for a currently scanned object, and finally transfers these to the respective circuits. Line sensor driver 65 receives a light exposing control signal φSH from synchronizing signal generator 64 and generates the signals φSH, φRS, φ1 and φ2 necessary for driving line sensor 45 and a clock signal SCLK. Since the operation of line sensor driving is generally known, the explanation thereof is omitted here.

Analog processor 66 not only regulates the amplitude, current and voltage of the signals so that the output signal of the line sensor can be processed in the pre-processor 67 but also calibrates a color unbalance generated due to the difference in the irradiating intensities of the light sources, the difference in the transmission ratio of the color filters, the chromatic aberration of the lens, and the difference of sensitivities of the line sensor according to wavelengths. Pre-processor 67 calibrates shading error, as mentioned above, and shown in FIGS. 13A through 13D via hardware and, at the same time, performs analog-to-digital conversion of the image signal and transfer the result to the tone calibrator 68 and color calibrator 69.

Since the driving control of the color filters in the embodiment of the present invention is a phase-locked loop control by conventional pulse width modulation and since lamp driver 50, motor driver 49, photo sensor 54 and interfacing unit 72 are generally known, the detailed explanation of circuitry and operational thereof will be omitted.

Figure 16:
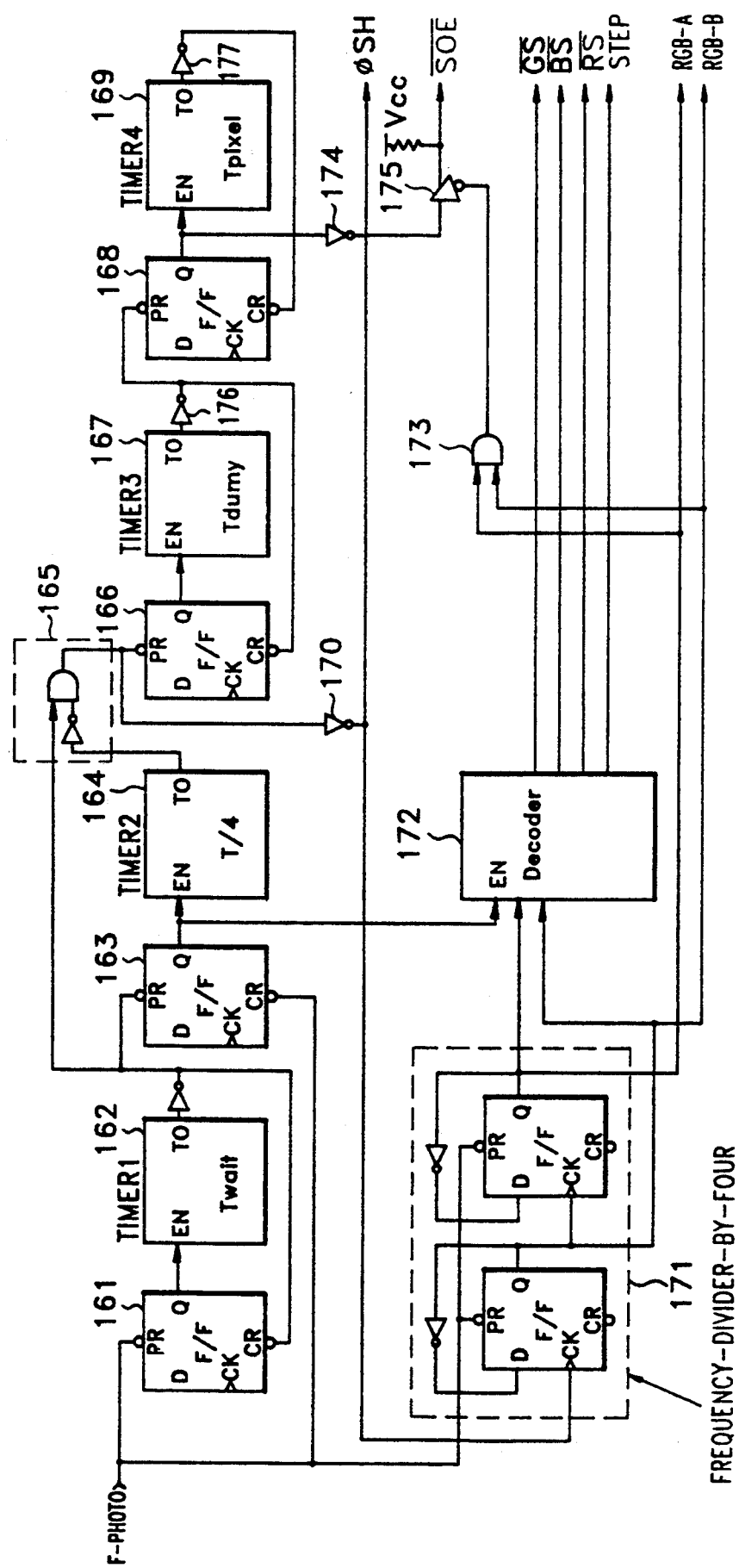
FIG. 16 is a block diagram showing a detailed configuration of the synchronizing signal generator shown in FIG. 15.

The present invention relates to an apparatus which synchronizes the scanning order according to the filter location detecting signal, maintains the color balance of the scanned image signals of the respective wavelength bands through a common amplifier, performs analog-to-digital conversion and the shading calibration through a common pre-processor, performs the tone calibration and color calibration in synchronization with the color filter location, and transfers the image-bearing object to the next scanning location. Thus, synchronizing signal generator 64 has a great significance, and the detailed configuration thereof is shown in FIG. 16 and, the operation of various signals according to the operation of color separation filter shown in FIG. 17 using various output signals thereof.

Figure 17:
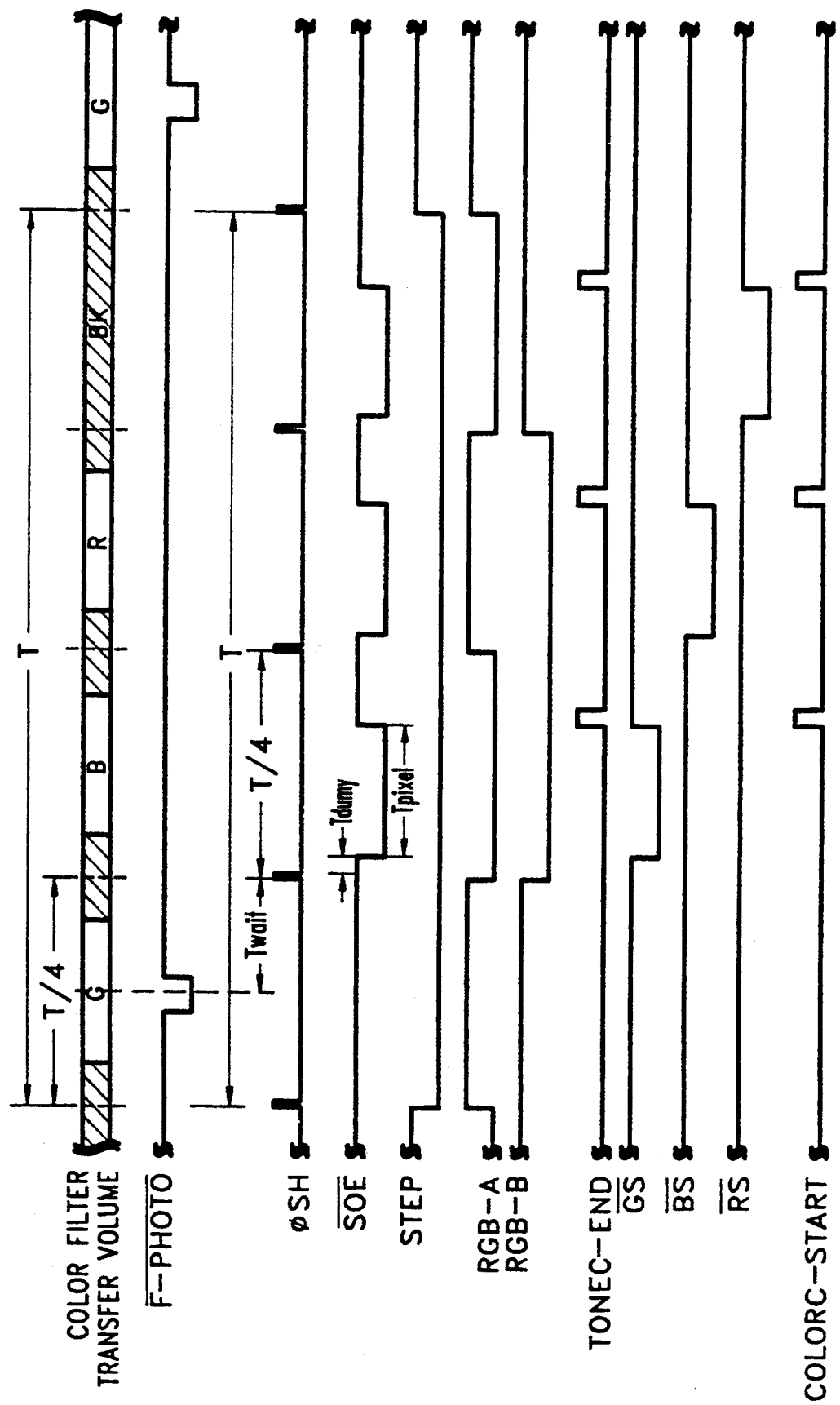
FIG. 17 is a timing diagram showing a timing relationship between a filter groove location detecting signal and various other signals.

In FIG. 17, a reference letter T is the time necessary for scanning one line of color images and T/4 is the time for scanning the respective colors. Also, it is assumed that the rotary filter shown in FIGS. 7 and 10 is adopted. Since the movement locus of the color filter are the same as that of the line sensor on the time axis, the detailed explanation for the flat plate filter can be substituted by that for the rotary filter provided hereinbelow.

While the groove position of the filter passes through the photosensor, according to one rotation of the rotary filter, the photosensor generates an F-PHOTO signal. In the rotary filter shown in FIG. 10, when a green filter comes to the location of the line sensor, an F-PHOTO signal is generated. Delay time Twait between the φSH signal and F-PHOTO signal shown in FIG. 17, which is varied according to the arrangement of a color separating filter, photosensor and line sensor, is controlled according to the time for the color filter of a subsequent color to be positioned exactly on the line sensor, after the groove is detected by the photosensor. Such a time control is performed by a first timer 162 shown in FIG. 16. First timer 162 starts its operation if the F-PHOTO signal is applied through flip-flop 161, and automatically stops its operation after a duration Twait and waits for a subsequent F-PHOTO signal to be applied. Second timer 164 operates in a period T/4 as the F-PHOTO signal is applied and the output signal of the first timer 162 is applied after the Twait period through flip-flop 163. The output signal of second timer 164 is provided as a control signal 4, SH which controls the light exposing time of the line sensor 45 through logic circuits 165 and 170 and provided to third timer 167 through flip-flop 166. Second timer 164 starts to operate by the output signal of first timer 162, generates the output signal four times and is reset by the F-PHOTO signal. At this time, if one rotation period of the rotary filter is different from the period for generating outputs of the second timer four times, a rotation speed deviation of the rotary filter is generated, and accordingly, the former should not differ from the latter.

The sensor output enabling signal $\overline{SOE}$ shown in FIG. 17 is a signal for identifying the block in which the valid pixel value of the line sensor is generated. The practical line sensor has an internal delay factor according to its configurational characteristics. This delay is generally called an initial dummy pixel. Since the amount of the initial dummy pixels is different according to line sensor type, it can be properly regulated in application. Third timer 167 shown in FIG. 16 is devised to control the amount of initial dummy pixels. After the initial dummy pixels are eliminated during the operation of a period T/4, it detects Tpixel of output period of the valid pixels to generate a $\overline{SOE}$ signal through flip-flop 168, invertor 174 and buffer 175. Buffer 175 controls the output of $\overline{SOE}$ signal by RGB-A and RGB-B provided through AND gate 173. The output block of the valid pixels is identified by a fourth timer 169 shown in FIG. 16. Accordingly, the time difference Tdummny between T/4 and Tpixel is automatically treated as the dummy pixel period. Meanwhile, since the $\overline{SOE}$ signal is released during the null interval, that is, the period allotted for transferring the object to be scanned, the subsequent operation is not processed.

In FIG. 17, the RGB-A and RGB-B signals are count outputs of a divide-by-four frequency divider 171 shown in FIG. 16, which is initialized by the F-PHOTO signal as the color filter identifying signal and receives the φSH signal as a clock input for counting the output of second timer 164. In other words, if the RGB-A and RGB-B values are "11," a null interval (that is, an interval in which valid image data is not generated by the line sensor) is generated and green, blue and red image information is generated by the line sensor when the RGB-A and RGB-B values are "00," "01" or "10," respectively. Accordingly, a decoder 172 generates the information on the colors being scanned as a $\overline{GS}$, $\overline{BS}$ and $\overline{RS}$ in the case of green, blue and red color information, respectively, and generates a STEP signal for shifting the object to be scanned to the next line, after red-image-scanning is completed. Meanwhile, the TONEC-END and COLORC-START signals which are generated in the microprocessor 60 of FIG. 15 are signals indicating the completion of the tone calibration which is performed simultaneously with scanning the respective colors of R, G and B, and controlling the start of the color calibration after completing the scanning of one line of the R, G and B color image and the tone calibration.

Figure 18:
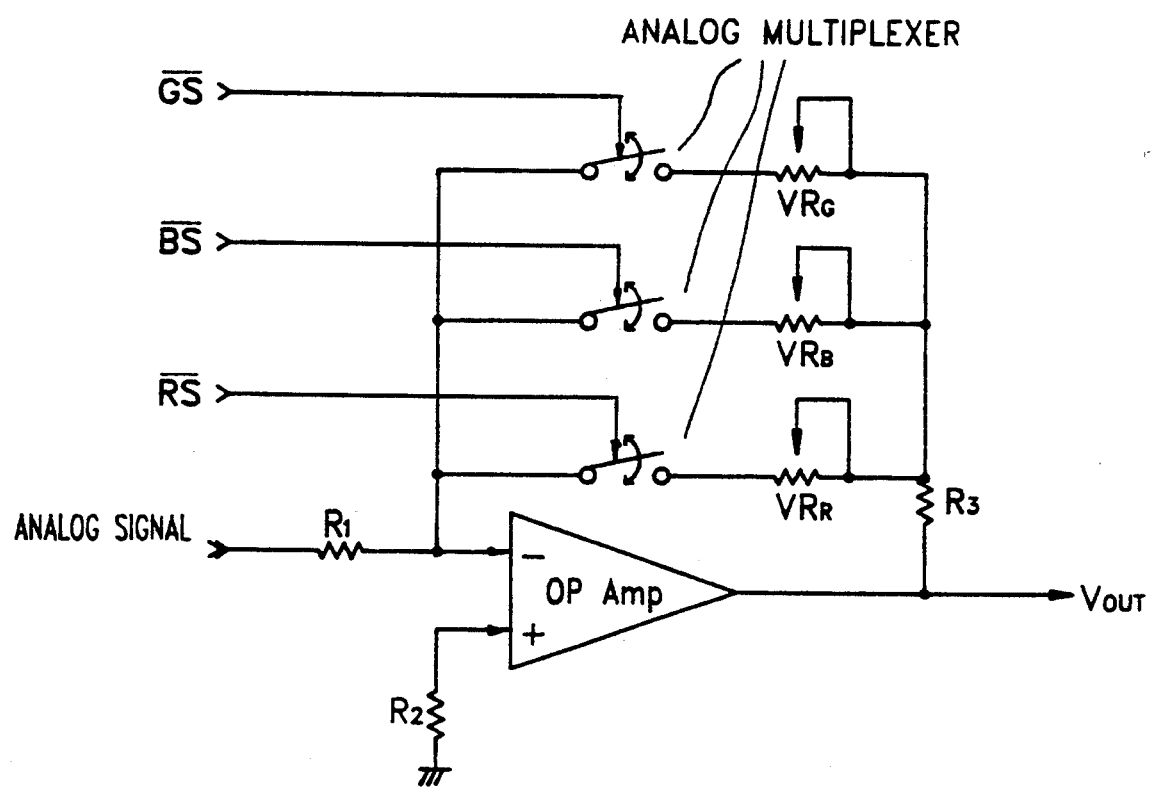
FIG. 18 is a block diagram showing a detailed configuration of the analog processor shown in FIG. 15.

In FIG. 18 which is a detailed circuit diagram showing the analog processor shown in FIG. 15, the color balance processing mentioned above is performed. The technical point herein is to control the difference in outputs of the line sensors according to the colors by the shift of a color separating filter and the gain of the respective colors is controlled by using an operational amplifier. It is constructed so that the gain values for the respective colors, that is, gain factors of the operational amplifier are multiplexed using the output signals $\overline{GS}$, $\overline{BS}$ and $\overline{RS}$ of the decoder 172 shown in FIG. 15.

Figure 19:
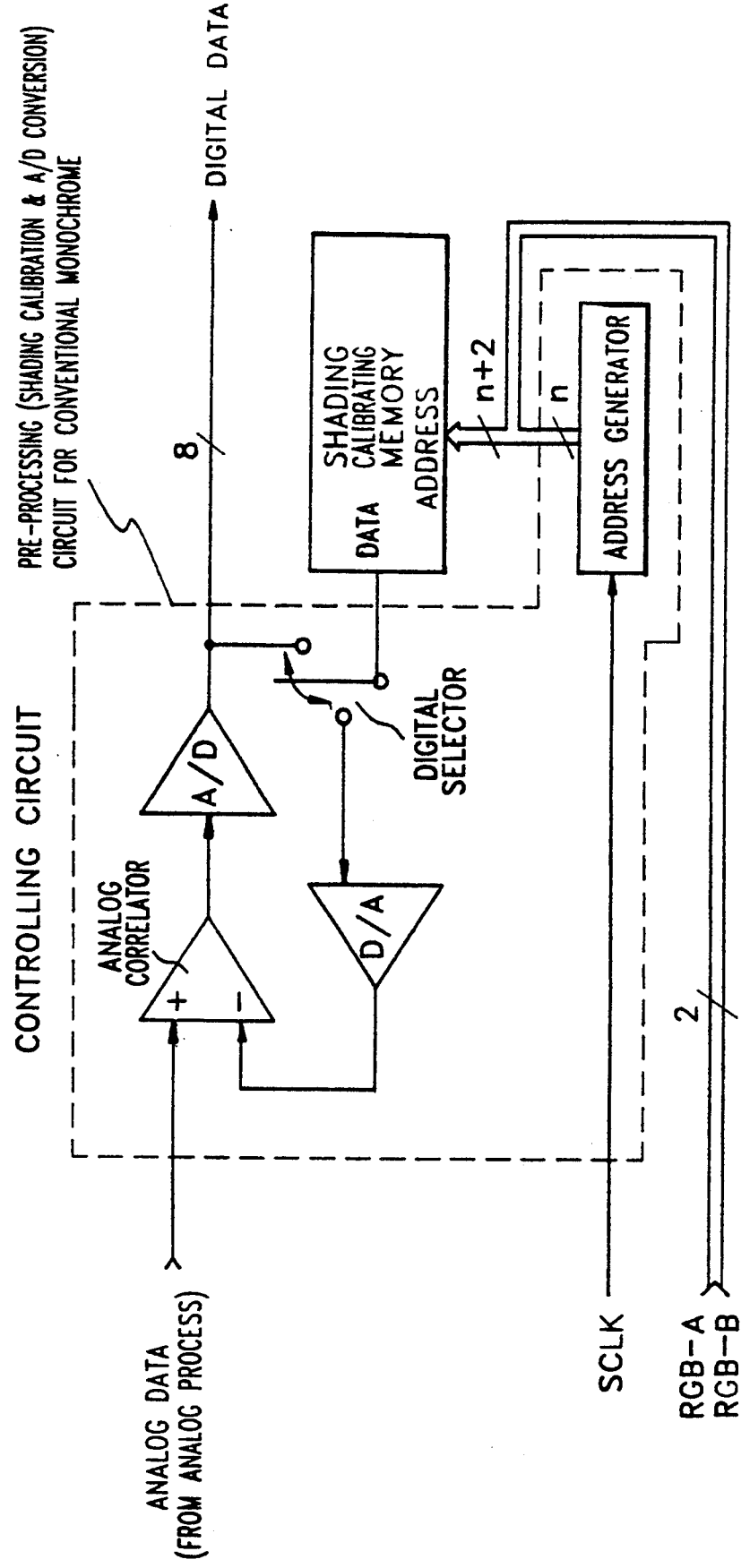
FIG. 19 is a block diagram showing a detailed configuration of the preprocessor shown in FIG. 15.

FIG. 19 is a circuit diagram showing the detailed configuration of the pre-processor shown in FIG. 15. A shading calibrater and analog-to-digital converter shown within the dotted line in FIG. 19 are proposed for a monochromatic color mode, but have limitations when applied to color images. The simplest method is to provide the respective shading calibrators and analog-to-digital converters for the three wavelength bands of R, G and B colors, which increases cost without improving performance if not processed in parallel. Among pre-processing functions, the since analog-to-digital conversion is the same as that of the conventional method, the explanation thereof will be omitted, and only a shading calibration function will be explained. The shading calibration is to perform such an operation as exemplified by Equation 7, by scanning a color sample segment of a reference color. Here, the value of the color sample segment is the data used for performing shading calibration. If the color balance of red, green and blue is identical to the gamma characteristic, the shading calibration data is commonly applicable for the R, G and B image information, but, this being unrealistic, the shading calibration data should be separately applied for each color signal. The application of Equation 7 to a color mode is as follows.

$$I(X, Y) = 256 \left( \frac{I_{org}(X, Y)}{I_{wht}(X, Y)} \right) \quad (9)$$

Here, Y represents one color among red, green and blue. In practice, the principle of shading calibration is not necessarily different for each color, and the only problem lies in the application of shading calibration data for each color. In the present invention, the data for calibrating the respective colors of R, G and B is stored in the shading calibrating memory, and the RGB-A and RGB-B signals generated through frequency divider-by-four 171 of FIG. 16 are used as the extension bits of address for controlling the shading calibrating memory.

Figure 20:
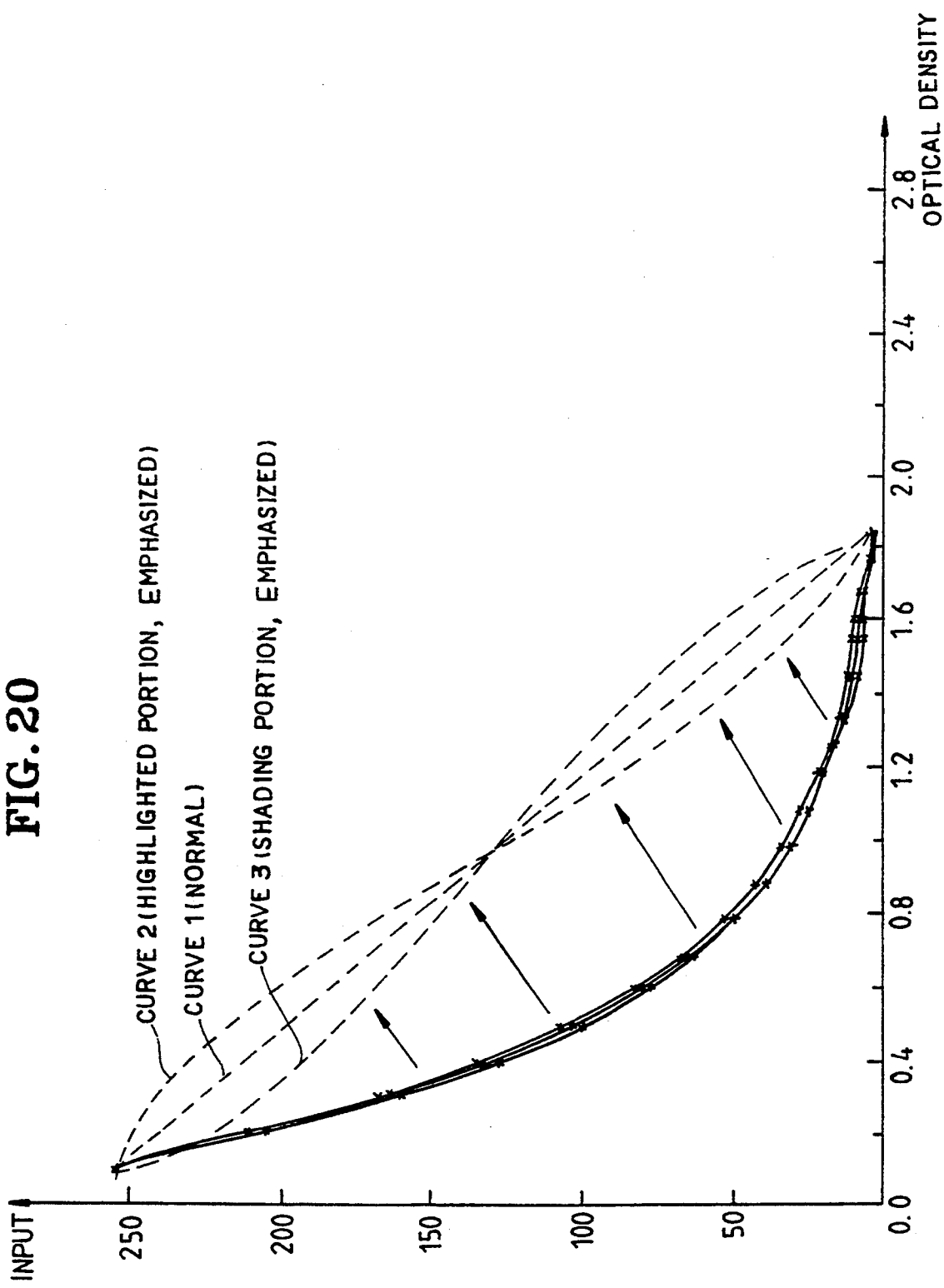
FIG. 20 is a characteristic diagram showing tone calibrating characteristics.
Figure 21A:
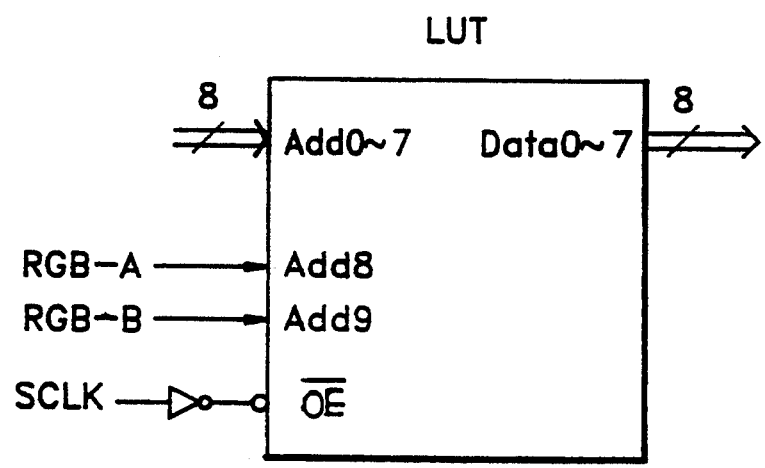
FIGS. 21A and 21B show structures of a tone calibrating circuit and a tone calibrating look-up table.
Figure 21B:
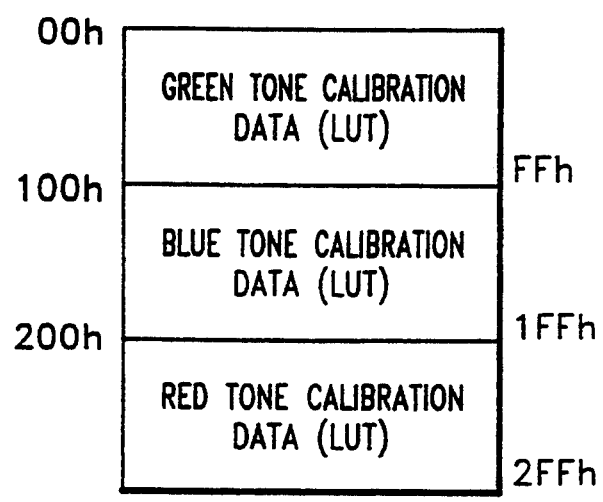

FIG. 20 is a characteristic graph showing the output values of the line sensor for density values and the tone calibrating characteristics, and FIGS. 21A and 21B show the tone calibrator 68 of FIG. 15 and the look-up tables for performing red, green and blue tone calibration. In tone calibration, the gamma characteristics of the respective R, G and B colors are regulated. Here, for the density value which means an optical density, the line sensor has an exponential relation therewith, while human visual sensitivity characteristics have a linear relation therewith. An image scanning apparatus which quantifies a reflected light after a predetermined quantity of light is incident to a scanned object, consequently quantizes the reflecting characteristics of the scanned object according to the locations. In other words, the line sensor in the image scanning apparatus has a linear relation with a reflective index R expressed as: where IREFLECTED is the intensity of the reflected light and IINCIDENT is the $$R = \frac{I_{REFLECTED}}{I_{INCIDENT}} \quad (10)$$

intensity of the incident light.

The reflective index (R) and optical density Do have the following relationship.

$$D_o = -\log R \quad (11)$$

Accordingly, a reflective index of 100% translates into an optical density of 0.0 while a reflective index of 0.01% translates into an optical density of 2.0. The horizontal axis of FIG. 20 indicates the scanned values in case a tone calibration has not been performed. Here, it is understood that the characteristics of the line sensor has an exponential relation with an optical density. Meanwhile, since human visual characteristics have a linear relation with the optical density, it is the principle of tone calibration to correspond to the form represented in the dotted line in FIG. 20. The horizontal direction indicates the optical densities of the color sample segments of a used achromatic color. As a result, if the tone reproductive fields to be reproduced on the basis of optical density, are set for optical densities of 0.0 to 2.0, the conversion of the optical densities into the values corresponding to the input values will do. That is to say, in the case of 8-bit quantization, the output value "0" corresponds to an optical density of 0.0, 255 corresponds to an optical density of 2.0, and the intermediate values are merely interpolated.

Color calibrator 69 shown in FIG. 15 matches the spectrum characteristics of three wavelength bands of the image scanning apparatus with those of an image output system or human vision. Limiting the spectrum characteristics to color matching to a specific system is called a device-dependent color calibration and matching the spectrum characteristics to the color coordinating system stipulated by the CIE is called a device-independent color calibration, which are influenced by the determining basis of color calibration coefficients rather than the difference in the embodiments of the practical systems.

Color calibration methods include $3 \times 3$ linear masking or $3 \times 9$ nonlinear masking as well as three dimensional UT methods. The present invention adopts a $3 \times 3$ linear masking method.

The $3 \times 3$ linear masking method is defined as the following relationship. Here, a subscript letter c indicates the calibrated value and r indicates the input row data.

$$R_c = a_{11}R_r + a_{12}G_r + a_{13}B_r$$

$$G_c = a_{21}R_r + a_{22}G_r + a_{23}B_r$$

$$B_c = a_{31}R_r + a_{32}G_r + a_{33}B_r$$

Figure 22:
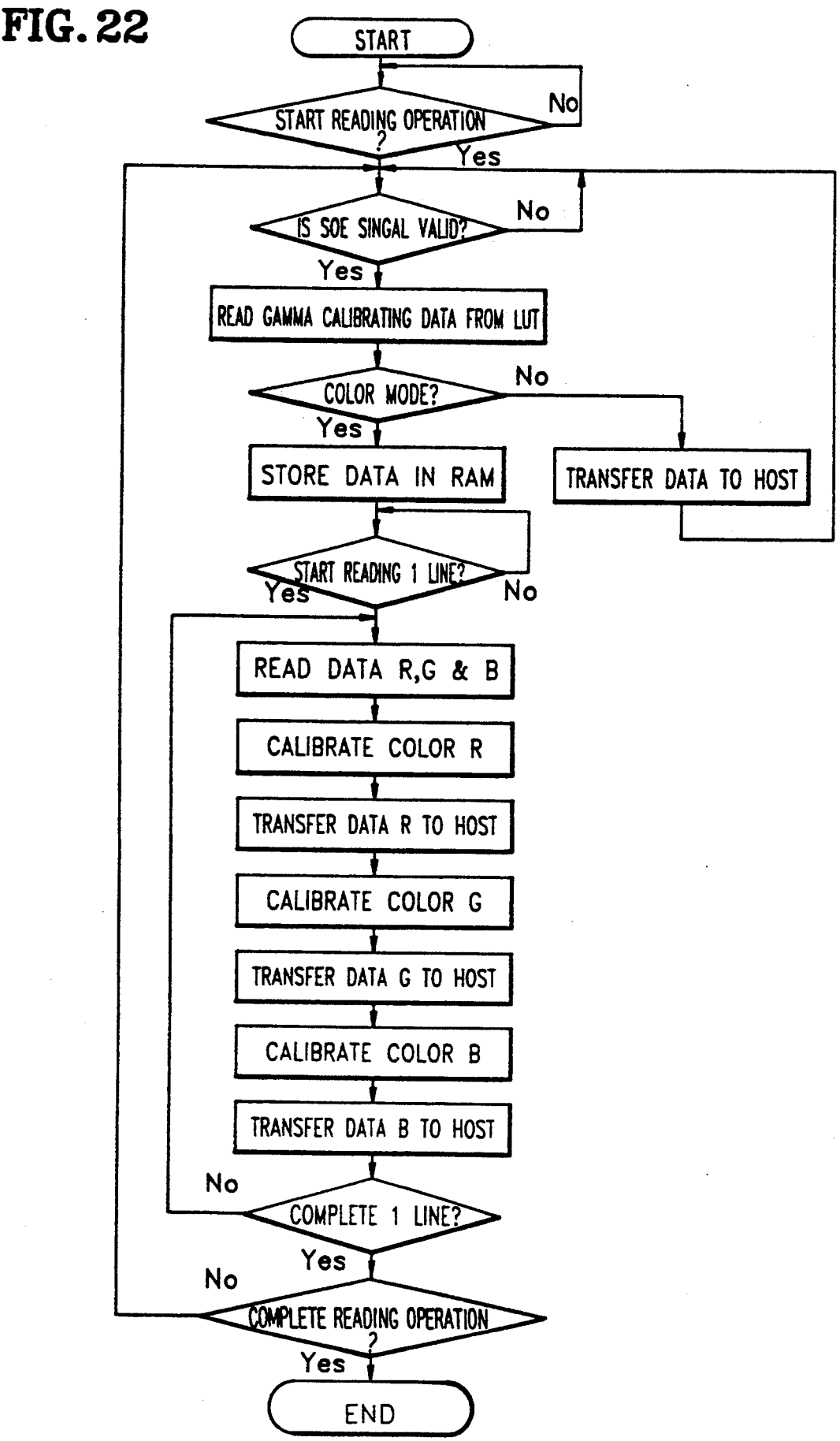
FIG. 22 is a flow chart showing the processing of a tone and color calibration.
Figure 23:
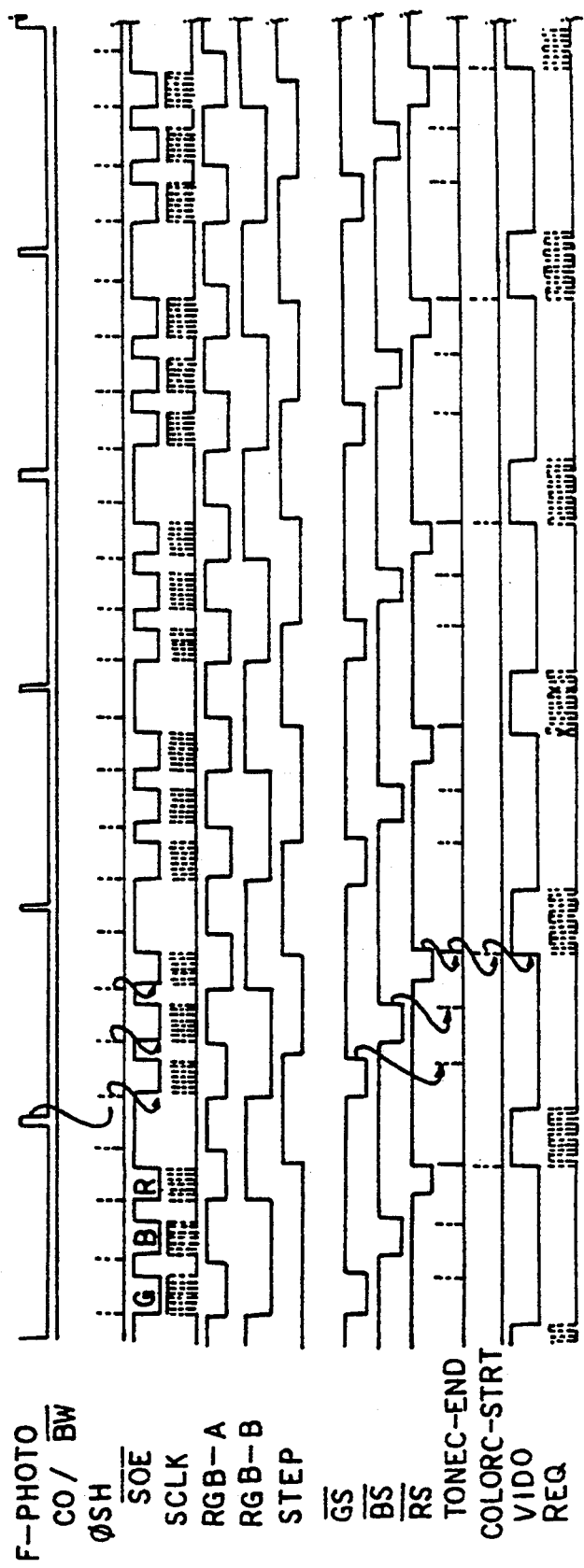
FIG. 23 is a timing chart of the operation of a tone and color calibration.

Here, $a_{11}, a_{12}, \ldots a_{32}, a_{33}$ are color calibration coefficients which are determined by the spectrum characteristics of the designed image scanning apparatus and the referenced color coordinating system. Accordingly, color calibrator 68 shown in FIG. 15 performs a $3 \times 3$ matrix operation and functions as a controlling device of scanning and writing the image data memory. FIG. 22 is a flow chart of tone and color calibrations and FIG. 23 is the operational waveforms thereof. The tone calibration is performed independently on the three wavelengths of the respective colors. However, in the color calibration, the respective colors at a specific pixel point in a specific line should be considered simultaneously.

In FIG. 23, signal CO/$\overline{BW}$ denotes mode of color/black-white, VIDO denotes the output of valid image data, and REQ denotes request for the outputting valid image data to external device.

In the present invention, since three wavelength information scanning is performed in a line sequential method, after scanning all of three wavelength information of a specific scanning line, the color calibration is performed in the null interval to shift the manuscript to the subsequent location.

Although it is possible to switch filters by a plane sequential method, it is uneconomical because a memory enabling to store the image information of one page portion is necessary to calibrate the color. The present invention concretely proposes a method considering such characteristics. Also, the present invention is devised so that the color information of the scanned image and the respective processing within the allotted time during one line scanning period are completely synchronized according to the movements of filters, thereby preventing the deterioration of a picture quality and processing an input efficiently.

As described above, the image scanning apparatus according to the present invention attains simply an effect of a shading calibration by arranging color filters and a line sensor so that a shading distortion can be calibrated geometrically.

Also, the image scanning apparatus according to the present invention has an advantage in that a resolution can be increased by installing a plurality of combinations of three color filters to a color separating filter such as a rotary filter or flat plate filter, without increasing the movement speed of a color separating filter.

Moreover, the image scanning apparatus according to the present invention can reduce a color registration error due to a manuscript transfer by reducing the refractive index of a color separating filter by inserting the color filter in the area which a part of the color separating filter such as a rotary filter or flat plate filter is removed.

What is claimed is:

1. An image scanning apparatus for receiving a color image, comprising:
   a light source having a rod-like shape for generating a light signal having plural color components and irradiating said light signal onto the surface of an object;
   a transfer apparatus for controlling the relative motion of said light source with respect to said object;
   a color separating filter for separating the light signal reflected and transmitted from said object surface into plural color signals, by arranging a set of color filters corresponding to the respective color components in a predetermined pattern;
   a line sensor for receiving said separated light signal through one of said color filters and outputting an electrical signal corresponding to the intensity of said received light signal; and
   driving means for adjusting a relative location between said color separating filter and said line sensor and combining the color separating filter and the line sensor in a predetermined order,
   wherein the width of a light receiving surface of each said color filter gradually increases from the central area thereof to the periphery and the longitudinal axis of said line sensor is disposed in parallel with that of said light receiving surface.

2. An image scanning apparatus as claimed in claim 1, characterized in that at least one side of the longitudinal directions of the light receiving surface of said color filter is a concave curved surface.

3. An image scanning apparatus as claimed in claim 2, characterized in that said color filters occupy one of phi-shaped fields having the same divisional angle on a circular plate which rotates at a constant speed and the angles of linear sides of the adjacent color filters are the same.

4. An image scanning apparatus as claimed in claim 3, characterized in that the number of said phi-shaped fields are integral multiples of the number obtained by adding one to the number of one set of color filters.

5. An image scanning apparatus as claimed in claim 4, characterized in that said color separating filter has a groove for detecting a reference location and said driving means have at least one groove detecting sensor to locate said groove.

6. An image scanning apparatus as claimed in claim 5, characterized in that said manuscript transfer apparatus is interlocked with said driving means and transfers said manuscript by one line interval if the field not occupied by said color filter among the phi-shaped fields of said color separating filter intercepts the optical path to said line sensor.

7. An image scanning apparatus as claimed in claim 1, characterized in that said color filters are installed on a flat plate which moves in a linear movement and the equi-distance is maintained between the linear sides of the adjacent color filters.

8. An image scanning apparatus as claimed in claim 7, wherein said driving means comprises:
   a timer which is synchronized at the time of detection of said reference location detecting groove by means of said groove detecting sensor, for generating a pulse signal ascending and descending in a period corresponding to the movement period between said adjacent color filters;
   a first frequency divider for generating a frequency-divided-by-two pulse signal by receiving the pulse output of said timer;
   a second frequency divider for generating a frequency-divided-by-two pulse signal by receiving the pulse output of said first frequency divider; and
   a decoder for generating the signal which differentiates the color filters, correspondingly to the pulse signals output from said first and second frequency dividers.

9. An image scanning apparatus as claimed in claim 1, characterized in that said color filters are inserted in the excised part of said color separating filter.

10. An image scanning apparatus as claimed in claim 1, wherein said color separating filter further comprises a transparent plate layer and color filters to be inserted in the excised part of said plate layer to reduce a color registration error due to the refractive index of said plate layer.

11. An image scanning apparatus comprising:
   a color separating filter in which at least one set of color filters are arranged;
   a line sensor for photoelectrically converting a light signal transmitted through one of said color filters, and sequentially outputting the photoelectrically converted light signal;
   a filter driving unit for driving said color separating filter so that said color filters transversely cut the optical path of said light signal sequentially;
   an analog processor for calibrating color unbalance between color signals by amplifying the color signals generated in said line sensor sequentially by respective predetermined amplifying factors;
   a pre-processor connected to said analog processor for shading calibrating the color signals the color unbalance of which is calibrated; and a tone calibrating unit connected to said pre-processor for generating a tone calibrated color signal by receiving the shade-calibrated color signal.

12. An image scanning apparatus as claimed in claim 11, further comprising a color calibrating unit connected to said tone-calibrating unit, for calibrating the tone-calibrated color signal so that the shade-calibrated color signal is adopted to the human visual system.

13. An image scanning apparatus as claimed in claim 11, characterized in that said analog processor comprises:

an analog amplifier;
a gain determining unit comprising a plurality of amplified gain determiners the number of which are corresponding to that of color filters installed in said color separating filter and which determines the amplified gain of said amplifier suitable to said respective color filters; and
a multiplexer interlocked with the operation of said filter driving unit, for selecting the amplified gain determiner.

* * * * *